United States Patent
Helm et al.

(10) Patent No.: US 10,384,167 B2
(45) Date of Patent: Aug. 20, 2019

(54) SYSTEMS AND METHODS FOR IMPROVING PERFORMANCE OF OSMOTICALLY DRIVEN MEMBRANE SYSTEMS

(71) Applicant: OASYS WATER LLC, Dover, DE (US)

(72) Inventors: Zachary Helm, Waltham, MA (US); Homayoun Moaddel, Wayland, MA (US); John Charest, Somerset, MA (US); Peter F. Moran, Amherst, NH (US)

(73) Assignee: OASYS WATER LLC, Dover, DE (US)

( * ) Notice: Subject to any disclaimer, the term of this patent is extended or adjusted under 35 U.S.C. 154(b) by 705 days.

(21) Appl. No.: 15/040,552

(22) Filed: Feb. 10, 2016

(65) Prior Publication Data

US 2016/0158705 A1 Jun. 9, 2016

Related U.S. Application Data

(63) Continuation-in-part of application No. 14/547,299, filed on Nov. 19, 2014.

(60) Provisional application No. 62/118,856, filed on Feb. 20, 2015, provisional application No. 62/114,155, filed on Feb. 10, 2015, provisional application No.
(Continued)

(51) Int. Cl.
| | |
|---|---|
| B01D 65/10 | (2006.01) |
| B01D 67/00 | (2006.01) |
| B01D 61/00 | (2006.01) |
| C02F 1/44 | (2006.01) |

(52) U.S. Cl.
CPC ........ *B01D 65/108* (2013.01); *B01D 61/002* (2013.01); *B01D 65/106* (2013.01); *B01D 67/0088* (2013.01); *B01D 67/0093* (2013.01); *C02F 1/445* (2013.01); *B01D 2311/12* (2013.01); *Y10T 29/49746* (2015.01)

(58) Field of Classification Search
None
See application file for complete search history.

(56) References Cited

U.S. PATENT DOCUMENTS 2,596,930 A * 5/1952 Kaiser ................ B01J 41/13
210/683
3,546,197 A   12/1970 Benko
(Continued)

FOREIGN PATENT DOCUMENTS

| CN | 102323278 A | 1/2012 |
| EP | 0432358 A1 | 6/1991 |
(Continued)

OTHER PUBLICATIONS

Liu, Li-Fen et al., "Study on a novel polyamide-urea reverse osmosis composite membrane (ICIC-MPD) I. Preparation and characterization of ICIC-MPD membrane", Journal of Membrane Science, vol. 281, pp. 88-94 (Mar. 12, 2006).
(Continued)

*Primary Examiner* — Krishnan S Menon
*Assistant Examiner* — Brad Gordon
(74) *Attorney, Agent, or Firm* — Leason Ellis LLP

(57) ABSTRACT

The invention relates to repairing and/or modifying a surface of a membrane in osmotically driven membrane systems by the introduction of one or more substances to the membrane.

6 Claims, 6 Drawing Sheets

Related U.S. Application Data

62/019,109, filed on Jun. 30, 2014, provisional application No. 61/987,909, filed on May 2, 2014, provisional application No. 61/953,016, filed on Mar. 14, 2014, provisional application No. 61/907,160, filed on Nov. 21, 2013.

(56) References Cited

U.S. PATENT DOCUMENTS

| | | | |
|---|---|---|---|
| 3,563,929 A * | 2/1971 | Guldenpfenni | C08G 59/1455 204/498 |
| 3,764,585 A | 10/1973 | Siclari et al. | |
| 3,789,993 A | 2/1974 | Brown et al. | |
| 3,926,798 A | 12/1975 | Cadotte | |
| 4,250,029 A | 2/1981 | Kiser et al. | |
| 4,383,923 A | 5/1983 | Elfert | |
| 4,584,103 A | 4/1986 | Linder et al. | |
| 4,784,880 A | 11/1988 | Coplan et al. | |
| 4,849,106 A | 7/1989 | Mir | |
| 4,874,527 A | 10/1989 | Gill | |
| 4,889,363 A | 12/1989 | Yamamoto et al. | |
| 4,894,165 A | 1/1990 | Fibiger et al. | |
| 4,906,379 A | 3/1990 | Hodgins et al. | |
| 4,927,540 A | 5/1990 | Wessling et al. | |
| 4,933,090 A | 6/1990 | Gill et al. | |
| 4,960,518 A | 10/1990 | Cadotte et al. | |
| 5,028,337 A | 7/1991 | Linder et al. | |
| 5,039,421 A | 8/1991 | Linder et al. | |
| 5,163,977 A | 11/1992 | Jensvold et al. | |
| 5,173,335 A | 12/1992 | Arthur | |
| 5,256,303 A | 10/1993 | Zeiher et al. | |
| 5,300,231 A | 4/1994 | Cha | |
| 5,358,640 A | 10/1994 | Zeiher et al. | |
| 5,418,053 A | 5/1995 | Lin | |
| 5,693,227 A | 12/1997 | Costa | |
| 5,755,964 A | 5/1998 | Mickols | |
| 5,843,351 A | 12/1998 | Hirose et al. | |
| 5,989,426 A | 11/1999 | Hirose et al. | |
| 6,026,968 A | 2/2000 | Hachisuka et al. | |
| 6,035,526 A | 3/2000 | Saruta et al. | |
| 6,152,995 A | 11/2000 | Edlund | |
| 6,432,314 B1 | 8/2002 | Storch et al. | |
| 6,590,067 B2 | 7/2003 | Kerres et al. | |
| 6,783,937 B1 | 8/2004 | Hou et al. | |
| 6,913,694 B2 * | 7/2005 | Koo | B01D 67/0088 210/490 |
| 7,001,518 B1 | 2/2006 | Tomaschke | |
| 7,396,465 B2 | 7/2008 | Wu et al. | |
| 7,491,334 B2 | 2/2009 | Comstock | |
| 7,638,053 B2 | 12/2009 | Yeager et al. | |
| 7,641,054 B2 | 1/2010 | Sasaki et al. | |
| 7,677,398 B2 | 3/2010 | Belfer et al. | |
| 7,727,434 B2 | 6/2010 | Kniajanski et al. | |
| 7,867,592 B2 | 1/2011 | Nelson et al. | |
| 7,879,971 B2 | 2/2011 | Kim et al. | |
| 7,882,963 B2 | 2/2011 | Mickols et al. | |
| 8,011,517 B2 | 9/2011 | Allen et al. | |
| 8,206,752 B2 | 6/2012 | Siegel et al. | |
| 8,317,906 B2 | 11/2012 | Bansal | |
| 8,328,906 B2 | 12/2012 | Miller et al. | |
| 8,455,557 B2 | 6/2013 | Linder et al. | |
| 8,505,743 B2 | 8/2013 | Sarkar et al. | |
| 8,541,060 B2 | 9/2013 | Messersmith et al. | |
| 8,551,894 B2 | 10/2013 | Seshadri et al. | |
| 8,567,611 B2 | 10/2013 | Cheng et al. | |
| 8,585,806 B2 | 11/2013 | Herron | |
| 8,710,109 B2 | 4/2014 | Linder et al. | |
| 8,857,629 B2 | 10/2014 | Allen et al. | |
| 9,089,820 B2 | 7/2015 | Koo et al. | |
| 9,175,036 B2 | 11/2015 | Kasher et al. | |
| 2002/0008066 A1 | 1/2002 | Kirkpatrick et al. | |
| 2002/0060185 A1 | 5/2002 | Hirose | |
| 2005/0031910 A1 | 2/2005 | Schwartz et al. | |
| 2006/0065598 A1 | 3/2006 | Comstock | |
| 2007/0243237 A1 | 10/2007 | Khaled et al. | |
| 2007/0251883 A1 | 11/2007 | Niu | |
| 2008/0096014 A1 | 4/2008 | Griesser et al. | |
| 2008/0203013 A1 | 8/2008 | Zhao et al. | |
| 2008/0207822 A1 | 8/2008 | Yeager et al. | |
| 2008/0302713 A1 | 12/2008 | Patrick | |
| 2009/0081797 A1 | 3/2009 | Fadeev et al. | |
| 2009/0188857 A1 | 7/2009 | Moore et al. | |
| 2009/0191399 A1 | 7/2009 | Moore et al. | |
| 2010/0015245 A1 | 1/2010 | Harrison et al. | |
| 2010/0143611 A1 | 6/2010 | Hutchinson et al. | |
| 2010/0239627 A1 | 9/2010 | Whitekettle et al. | |
| 2010/0256368 A1 | 10/2010 | List et al. | |
| 2011/0147308 A1 | 6/2011 | Johnston-Hall et al. | |
| 2011/0168626 A1 | 7/2011 | Tanaka et al. | |
| 2011/0198288 A1 | 8/2011 | Mayes et al. | |
| 2011/0284456 A1 | 11/2011 | Brozell | |
| 2011/0284458 A1 | 11/2011 | Mickols et al. | |
| 2012/0000846 A1 | 1/2012 | Herron | |
| 2012/0031842 A1 | 2/2012 | Freger et al. | |
| 2012/0043274 A1 | 2/2012 | Chi et al. | |
| 2012/0048805 A1 | 3/2012 | McCutcheon et al. | |
| 2012/0055867 A1 | 3/2012 | Shih et al. | |
| 2012/0111791 A1 | 5/2012 | Freeman et al. | |
| 2012/0168370 A1 | 7/2012 | Aoki et al. | |
| 2013/0213885 A1 | 8/2013 | Duan | |
| 2013/0256228 A1 | 10/2013 | Bharwada et al. | |
| 2013/0292252 A1 | 11/2013 | Linder et al. | |
| 2014/0004595 A1 | 1/2014 | Seshadri et al. | |
| 2014/0008298 A1 | 1/2014 | Park | |
| 2014/0054215 A1 | 2/2014 | McGinnis et al. | |
| 2014/0054221 A1 | 2/2014 | Agnihotri et al. | |
| 2014/0107237 A1 | 4/2014 | Yan et al. | |
| 2014/0175013 A1 | 6/2014 | Mechelhoff et al. | |
| 2014/0319044 A1 | 10/2014 | Giannelis et al. | |
| 2015/0165389 A1 | 6/2015 | McGinniss et al. | |
| 2015/0231572 A1 | 8/2015 | Vankelecom et al. | |
| 2015/0328588 A1 | 11/2015 | Schmidt-Leithoff et al. | |
| 2015/0375179 A1 | 12/2015 | Kim et al. | |
| 2016/0023171 A1 | 1/2016 | Phillip et al. | |

FOREIGN PATENT DOCUMENTS

| | | |
|---|---|---|
| EP | 2760569 A2 | 8/2014 |
| EP | 2902096 A1 | 8/2015 |
| EP | 2902097 A1 | 8/2015 |
| GB | 1473857 A | 5/1977 |
| GB | 2352772 A | 2/2001 |
| GB | 2390042 A | 12/2003 |
| JP | 2007167713 A | 7/2007 |
| WO | 199910089 A1 | 3/1999 |
| WO | 02095370 A2 | 11/2002 |
| WO | 2007009280 A1 | 1/2007 |
| WO | 2009076722 A1 | 6/2009 |
| WO | 2010082710 A1 | 7/2010 |
| WO | 2011088505 A1 | 7/2011 |
| WO | 2012173232 A1 | 12/2012 |
| WO | 2012173811 A2 | 12/2012 |
| WO | 2013046056 A2 | 4/2013 |
| WO | 2013136336 A1 | 9/2013 |
| WO | 2013154755 A1 | 10/2013 |
| WO | 2014075086 A1 | 5/2014 |
| WO | 2014095751 A1 | 6/2014 |
| WO | 2014111889 A2 | 7/2014 |
| WO | 2014164793 A2 | 10/2014 |

OTHER PUBLICATIONS

Belfer et al., "Surface Modification of Commercial Polyamide Reverse Osmosis Membranes by Radical Grafting: An ATR-FTIR Study", Acta Polym, vol. 49, pp. 574-582 (1998).

Cheng et al., "Surface Modification of a Commercial Thin-Film Composite Polyamide Reverse Osmosis Membrane Through Graft Polymerization of N-isopropylacralymide Followed by Acrylic Acid", Journal of Membrane Science, vol. 447, pp. 236-245 (2013).

Forster et al., "Amphiphilic Block Copolymers in Structure-Controlled Nanomaterial Hybrids", Advanced Materials, vol. 10, No. 3, p. 195 (1998).

(56) References Cited

OTHER PUBLICATIONS

Herzberg et al., "Surface Properties and Reduced Biofouling of Graft-Copolymers that Possess Oppositely Charged Groups", Biomacromolecules, vol. 12, pp. 1169-1177 (2011).

* cited by examiner

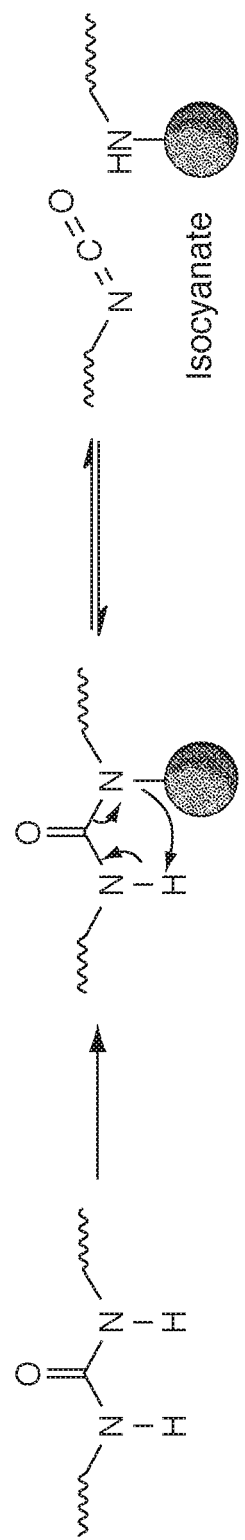

SYSTEMS AND METHODS FOR IMPROVING PERFORMANCE OF OSMOTICALLY DRIVEN MEMBRANE SYSTEMS

CROSS-REFERENCE TO RELATED APPLICATIONS

This application is a continuation-in-part of U.S. patent application Ser. No. 14/547,299, filed Nov. 19, 2014, which claims priority to and the benefit of U.S. Provisional Patent Application Nos. 61/907,160, filed Nov. 21, 2013; 61/953,016, filed Mar. 14, 2014; 61/987,909, filed May 2, 2014; and 62/019,109, filed Jun. 30, 2014; the entire disclosures of which are hereby incorporated by reference herein in their entireties. This application also claims priority to and the benefit of U.S. Provisional Patent Application Nos. 62/114,155, filed Feb. 10, 2015, and 62/118,856, filed Feb. 20, 2015; the entire disclosures of which are also hereby incorporated by reference herein in their entireties.

FIELD OF THE INVENTION

The invention generally relates to osmotically driven membrane systems and membranes for use therein, and more particularly to repairing and/or altering a surface of one or more membranes and improving performance of the membrane system.

BACKGROUND

Generally, membranes are used in osmotically driven membrane processes to separate a solvent from solute(s) within a solution. In the case of a forward osmosis (FO) process, a first solution is brought in contact with one surface of the membrane and a second solution is brought into contact with a second, opposing surface of the membrane. Solvent will permeate through the membrane from the less concentrated solution to the more concentrated solution, while the solutes are prevented from passing through the membrane. In the case of reverse osmosis (RO), a solution is brought into contact with one surface of the membrane under pressure. The pressure causes the permeation of the solvent through the membrane, which again prevents the passage of the solutes from within the pressurized solution. Forward and reverse osmosis membranes typically include a thin film barrier layer disposed on a porous support layer.

Traditionally, membrane layers have been manufactured to suit a particular application and via traditional processes. See, for example, U.S. Pat. No. 7,882,963, the disclosure of which is hereby incorporated by reference herein in its entirety. Generally, membranes are put in service, and other than periodic cleaning, perform their intended functions for their useful life. Once a membrane reaches the end of its useful life or otherwise becomes unusable (e.g., damaged), the membrane is replaced and discarded. New membranes are costly and the maintenance/replacement procedures can require a certain amount of system down time, which can be costly and inconvenient. In one case, where the membrane active layer has been damaged, the damage can result in the passage of various solutes through the membrane. Depending on the use of the osmotically driven membrane system, this can result in the loss of valuable solutes (e.g., during concentration of a pharmaceutical product) or passage of toxic substances into a purified product solvent (e.g., during water purification).

There has been much activity recently in the area of incorporating nanoparticles into membranes; however, these efforts have been focused on incorporating the nanoparticles in the initial manufacturing stages to produce a finished membrane. The nanoparticles are typically incorporated into the finished membrane to enhance fouling resistance and improve flux. There does not appear to date to be any effort to repair membranes after manufacture and/or while in use or to modify the performance of existing membranes.

SUMMARY

Prior art solutions were typically driven by a need to address fouling issues as opposed to repairing, improving, or otherwise altering existing membranes, in particular while in service. The claimed invention provides for the easy addition of a particular substance or combination of substances to the surface of an existing membrane that has been damaged or otherwise is not performing as desired. In a particular embodiment, a specific substance can be selected to enhance a polyamide membrane's salt rejection properties or flux capacity. In various embodiments, the substance can contain distinct hydrophobic and hydrophilic chains that can be selected to have different and specific properties for repairing and/or enhancing a membrane surface and its performance. For example, the substance can be selected to have properties that allow it to "stick" to relatively hydrophobic surfaces without the need for chemical attachment, which allows for the continued use of an in-service element, thereby extending its life. Also, the various systems and methods described herein can be used to repair various manufacturing defects (e.g., pin holes) that do not become known until the membrane is put in service or undergoing quality inspection and testing. In some cases, the membrane can be repaired or modified prior to being put in service. In addition, the various systems and methods described herein can be used to repair or modify essentially any selective type membrane (e.g., ultrafiltration, nanofiltration, reverse osmosis, forward osmosis, or anion/cation exchange). For example, in one embodiment, a nanofiltration membrane can be modified with an appropriate substance to effectively operate as a forward osmosis membrane in a particular application. For example, an existing nanofiltration membrane, which is more porous than a conventional osmotic membrane, tends to have higher flux and lower salt rejection characteristics. However, because it is more porous, it may lend itself better to a modification process. In accordance with any of the embodiments described herein, the nanofiltration membrane can be coated, where the coating compound can infiltrate the pores of the NF membrane, thereby improving the salt rejection characteristics thereof, while having a minimal to negligible effect on the flux. The improved salt rejection results in the formation of a membrane suitable for forward osmosis, but with higher flux capacity. Generally, the NF membrane can be coated with any of the substances described herein.

Generally, repairing or otherwise modifying a membrane surface (e.g., the retentate and/or permeate side of the membrane) can provide a beneficial service to the osmotically driven membrane system in which the membrane is used. These beneficial services can include extending the life of a damaged membrane, adapting the membrane to a change in the operating environment, altering one or more performance characteristics, and/or reducing fouling. In one case, preventing or at least reducing fouling on the membrane surface can assist in maintaining a higher and/or more constant flux level. Additionally, repairing/modifying a surface of a membrane in service can improve the overall performance of the osmotically driven membrane system; for example, by reducing ion exchange across the membrane or eliminating the need to replace the membrane.

In accordance with various embodiments of the invention, the substance(s) can be added to either a feed solution or a draw solution to facilitate the self-repair of one or more defects in one or more membranes or the transformation of one or more properties of the one or more membranes. The particular substance or substances to be added will be selected to perform a particular function and application (e.g., repairing a hole in a polyamide membrane or enhancing hydrophilicity of a polysulfone membrane support layer). Typically, the substance is selected to react with one or more molecules and/or the topography of the membrane surface(s), so that when the feed solution is introduced to the feed side of the membrane, the substance(s) will begin to attach itself to the surface of the feed side of the membrane, thereby starting the self-repair/modification process. Alternatively or additionally, the substance can be introduced into the draw side of the membrane or both sides depending on which membrane surface requires repair or modification.

In one aspect, the invention relates to a method of repairing a surface of a membrane in an osmotically driven membrane system. The term "repair" is generally used herein to encompass not only physically repairing a defect or damage, such as a hole in the membrane, but also to the modification of a surface characteristic of the membrane to, for example, improve flux or salt rejection, or adapt to a change in operating conditions. The method includes the steps of determining the presence of a defect, determining the nature of the defect, selecting at least one substance based on the nature of the defect, and introducing the at least one substance to at least one of a retentate side (i.e., feed side) or a permeate side of the membrane. Generally, "defects" include manufacturing defects; damage occurring to a membrane surface during handling, assembly, or while in use; or a change in the circumstance/environment of the operation of the system. The latter including, for example, the modification of a membrane surface to counteract degradation of system performance and/or the introduction of a feed solution having a different chemical composition. The nature of the defect includes such things as a hole in a membrane surface and/or layer (e.g., a hole in, or abrasion damage to, an active layer that allows undesirable solutes to pass through the membrane), the location of the defect (e.g., retentate side or permeate side of the membrane), and material compatibility issues. The at least one substance, which will be discussed in greater detail below, can be a single chemical or a complex composition of chemicals introduced in solid (e.g., a powder), gaseous, and/or liquid form to suit a particular application.

In various embodiments of the foregoing aspect of the invention, the method can be used to repair a hole in an active layer of the membrane, where the step of introducing the at least one substance includes depositing an amount of the at least one substance on the active layer of the membrane sufficient/effective to fill-in the hole. The specific amount necessary to repair the damage (e.g., filling a hole or resurfacing an abraded area) and the duration of the process will vary depending on such things as the size of the defect, the location of the defect, the membrane composition, the substance(s) introduced (e.g., the type of polymer used), the substance loading capacity, substance deposition rate, and the feed and/or draw solution composition. In addition, the method can be used to modify a performance characteristic of the membrane, where the step of introducing the at least one substance includes depositing an amount of the at least one substance on the membrane to "coat" the surface area of the membrane. Generally, the amount necessary would depend on the loading capacity necessary to effectuate the modification, for example, the amount needed to deposit a monolayer of the substance over the entire membrane surface. In some cases, the amount required may also be dependent on the % of the surface area to be covered, for example, in a flat sheet membrane assembly that is submerged in a tank, it may not be necessary to coat the entire membrane surface. The amount necessary to coat the membrane surface to any specific thickness and/or % surface area coverage and the duration of the process will vary depending on such things as the size of the membrane; the membrane composition; the substance(s) introduced, which includes the size of the polymer and the chemical nature of the polymer (e.g., hydrophilic, hydrophobic, or amphiphilic); and the nature of the modification to be performed (e.g., modifying a surface charge or increasing hydrophilicity). Typically, a substantial portion or all of the membrane surface area will be coated for maximum effectiveness of the repair. In one or more embodiments, the coating of the at least one substance modifies at least one of a surface charge of an active layer of the membrane, a hydrophilicity of a layer of the membrane (e.g., improving the hydrophilicity of the support/active layer), or salt rejection ability of the active layer of the membrane (typically, the at least one substance will improve the salt rejection ability of the active layer). In some embodiments, the at least one substance includes a polycation, a polyanion, a copolymer, a zwitterion, or a block copolymer, such as one including a hydrophobic chain, a polycation, a polyanion, or polar hydrophilic chain, such as a polystyrene (hydrophobic) or polycarboxylic (hydrophilic) chain.

In additional embodiments, the method includes the step of determining where to introduce the at least one substance (e.g., via the feed and/or draw solutions, directly to the membrane surface(s), or via a separate solution circulated through the membrane system). The determination of where to introduce the at least one substance is based on at least one of a location of the defect, the nature of the defect, membrane configuration (e.g., spiral wound or plate and frame), a performance characteristic of the osmotically driven membrane system or combinations thereof. The method can also include the step of determining how to introduce the at least one substance (e.g., solid, gas or liquid form, dosage, blend, rate of introduction, etc.). The determination of how to introduce the at least one substance is based on at least one of a location of the defect, the nature of the defect, membrane configuration, a performance characteristic of the osmotically driven membrane system, or combinations thereof.

In one or more embodiments of the method, the selection of the at least one substance is based on at least one of the nature of the defect, the location of the defect, a performance characteristic of the osmotically driven membrane system, or material suitability. Generally, different substances may be preferred if the defect is located on the retentate side of the membrane versus the permeate side. Also, a different substance or combination of substances may be preferred if the defect is a small pinhole versus a large rupture or just minor surface scarring, which also affects the amount of the at least one substance that will be needed. With respect to material suitability, this encompasses selecting the at least one substance to be compatible with the feed and/or draw solution chemistries that the membrane is exposed to during operation of the osmotically driven membrane system and the intended function of the substance (e.g., repairing a hole versus changing a performance or physical characteristic of the membrane).

In yet further embodiments of the method, the step of introducing the at least one substance includes introducing the at least one substance at, at least one of a predetermined dosage (e.g., the concentration of the substance within a solution used to deliver the substance), predetermined intervals, and/or for a predetermined duration. In some embodiments, the dosage, interval, and duration of the introduction of the at least one substance is carried out automatically by a control system in combination with the necessary valves, sensors, and electro-mechanical delivery devices to carry out a particular repair protocol. For example, sensors can be used to determine if a membrane surface has been damaged during operation (e.g., a decrease in salt rejection by the active layer, which may be representative of a hole in the membrane and determined with the use of a conductivity probe, pH probe, titrator, UV-vis analysis, Fourier transform infrared spectroscopy (FTIR), or other in-line instrumentation) and, in response to a measured characteristic, send a signal to actuate valves and/or delivery devices (e.g., a pump and/or other type of metering device) to introduce the at least one substance to one or more surfaces of the membrane. The step of introducing the at least one substance can also include varying a dosage of the at least one substance during operation of the osmotically driven membrane system (e.g., introduce an initial amount to effectuate the repair and then continue to introduce a different amount to maintain the repair, and/or introducing a second substance after the initial introduction of the at least one substance (e.g., the second substance can be one that is added to beneficially react with the first substance to, for example, complete the process started by the first substance).

Generally, the overall process can be enhanced by varying, for example, the rate of introduction of the at least one substance and/or the flow rates, pressures (e.g., pressurizing the feed and/or draw solutions), temperatures (e.g., the introduction of heat to the solution and/or substance can promote bonding), concentration levels of any of the substances introduced, changing the pH of the solution, changing the ionic strength of the solution, or combinations thereof. The quantity and the quality of the at least one substance introduced can also have an impact on the overall process. Additionally, the introduction of the at least one substance during the operation of the osmotically driven membrane system can happen continuously or intermittently. Generally, the substance(s) will be selected, at least in part, on its ability to impart rejection without negatively affecting the flux and its ability to be retained by the membrane.

In various embodiments, the step of introducing the at least one substance includes the steps of reorienting a permeate side of the membrane so that it is now a retentate side with respect to one or more flow paths of the system, as if in a reverse osmosis operation, introducing the at least one substance to the now retentate side of the membrane, and pressurizing a solution used to introduce the substance on the now retentate side for a predetermined time. The reorienting step may include operating one or more valves of the osmotically driven membrane system to change flow paths of any solution streams within the osmotically driven membrane system relative to the membrane. In some embodiments, the pressurizing step is repeated for X number of times, where X equals the number of applications necessary to affect the repair. Typically, various physical and/or performance characteristics of the membrane, the system, and/ or the substance to be added will be monitored to determine if an effective amount of the substance (e.g., total mass deposited and/or distribution thereof) has been deposited to achieve the desired result. Generally, the specific interval and duration of any single pressurizing step can vary to suit a particular application, for example, changing system performance by membrane modification versus repairing damage to an active and/or support layer of the membrane. Furthermore, the step of introducing the at least one substance can include the step of introducing a second substance to the osmotically driven membrane system. In some embodiments, the second substance is added after the first pressurizing step and then pressurized again or before the pressurizing step where it can mix/react with the at least one substance. Alternatively or additionally, the second substance can be added to the opposite side of the membrane as the at least one substance.

In various embodiments of the method, the introduction of the at least one substance can occur during the operation of the osmotically driven membrane system. For example, the at least one substance can be introduced to the membrane surface via a feed solution introduced to the retentate side of the membrane, a draw solution introduced to the permeate side of the membrane, or both. The concentration of the at least one substance within any of the solutions introduced can be controlled during operation of the system. The at least one substance can include, for example, benzalkonium chloride, polydiallyldimethylammonium chloride, polyethyleneimine, polyethylene glycol, polymeric biguanide, or combinations thereof. Various counter ions for use therewith include carboxylates, phosphonates, aldehydes, sulfates, sulfonates, sulfites, carbonates, and the like, for example, trisodium citrate, napthalene trisulfonic acid (NPT), or 4-formyl-1,3 benzene disulfonic acid disodium salt (FBS), with the specific counter ion chosen, in part, based on the primary substance used and the nature of the feed, e.g., acidic or basic.

In one aspect, the invention relates to a method of modifying an active layer of a membrane. The method includes exposing the active layer of the membrane to a solution including at least one substance selected to modify the physical characteristic of the active layer of the membrane substantially without impacting a flux rate of the membrane. The step of exposing the active layer of the membrane to a solution includes installing the membrane within an osmotically driven membrane system, introducing a polymeric biguanide as a first substance to the solution being introduced to the active layer side of the membrane, introducing at least one of napthalene trisulfonic acid or 4-formyl-1,3 benzene disulfonic acid disodium salt as a second substance to the solution being introduced to the active layer side of the membrane, introducing a draw solution to a side of the membrane opposite the active layer side, wherein the draw solution has an osmotic concentration greater than the solution introduced to the active layer, and operating the osmotically driven membrane system in a forward osmosis mode. The step of exposing the active layer of the membrane to the solution can include introducing at least one of the first or second substance at, at least one of a predetermined dosage, a predetermined concentration, predetermined intervals, or for a predetermined duration. The method may also include the step of rinsing the membrane active layer via interrupting the introduction of the solution to the active layer of the membrane and introducing a saline solution to the active layer of the membrane, wherein the saline solution may include about 50,000 to about 75,000 ppm of sodium chloride or other salt. The rinsing step may be carried out with or without the introduction of the draw solution.

In another aspect, the invention relates to a system for improving performance of a membrane in an osmotically driven membrane system. The system includes a forward osmosis membrane having a permeate side and a retentate side, a source of a feed solution in fluid communication with the retentate side of the forward osmosis membrane, wherein the feed solution includes a polymeric biguanide and at least one of napthalene trisulfonic acid or 4-formyl-1,3 benzene disulfonic acid disodium salt, a source of a draw solution in fluid communication with the permeate side of the forward osmosis membrane, wherein the draw solution comprises a carbonate and has an osmotic concentration greater than the feed solution, and means for exposing the retentate side of the forward osmosis membrane to the feed solution and the permeate side of the forward osmosis membrane to the draw solution to promote the modification of at least a portion of an active layer of the forward osmosis membrane via, for example, any necessary pumps, valves, plumbing, sensors, and controls.

In another aspect, the invention relates to a method of modifying a surface of a membrane, such as a finished membrane from a membrane manufacturing line. The method includes the steps of identifying a physical characteristic (e.g., a defect or operational parameter as discussed above) of the finished membrane and exposing the membrane surface to a solution comprising at least one substance selected to modify the physical characteristic of the membrane surface substantially without negatively impacting a flux rate or other operating parameter of the membrane and/or overall system. For example, a 5% or greater drop in overall system recovery would be considered a negative impact. Generally, system recovery (e.g., a total dissolved solids (TDS) concentration rate) is more important than a specific drop in flux rate, for example in some systems (e.g., a membrane brine concentrator), a 10% drop in flux is acceptable if 99% rejection is achieved, as substantial increases in TDS can still be achieved. The step of identifying the physical characteristic of the membrane includes at least one of visual inspection (e.g., via human or machine vision, with or without dye enhancement), measuring a performance characteristic of the membrane, for example, via a test cell (e.g., a forward or reverse osmosis operation, under vacuum, or during a wet-out procedure), measuring the charge characteristic of the membrane (e.g., zeta potential), the contact angle of the membrane and/or the conductivity of one of the fluid streams.

In various embodiments, the step of exposing the membrane surface to the solution includes at least one of at least partially submerging the membrane in the solution, dip coating, spray coating the at least one substance onto at least a portion of the membrane surface, and/or installing the membrane as finished within an osmotically driven membrane system and introducing the at least one substance to a solution being introduced to the osmotically driven membrane system, such as a feed stream or draw solution. The step of exposing the membrane surface to the solution may also include pre-coating at least a portion of one of the membrane surfaces and/or running a web of membrane material through at least one additional stage of a membrane manufacturing process. In some embodiments, a portion of a membrane surface may be pre-coated to prevent that portion of the membrane from being affected by the introduction of the at least one substance. The pre-coating in some cases can be removable after the target surface of the membrane has been exposed to the at least one substance. In one embodiment, the pre-coating may harmlessly dissolve over time during operation of the membrane within an osmotically driven membrane system. The solution used can include water, alcohol, or other types of solvents. In various embodiments, the step of exposing the membrane surface to the solution includes controlling at least one of the concentration of the at least one substance within the solution, a temperature of the solution, a pH of the solution, an ionic strength of the solution, a redox potential of the solution, and/or a duration of exposure.

In yet another aspect, the invention relates to a system for modifying a surface of a finished membrane. The system includes means for identifying a physical characteristic (e.g., a defect or operational parameter as discussed above, including pore size and/or charge) of the membrane and means for exposing the membrane surface to at least one substance selected to modify the physical characteristic of the membrane surface substantially without impacting a flux rate of the membrane. The at least one substance can include any of the substances disclosed herein.

In some embodiments, the identifying means includes visual inspection by a human or computer/machine. Generally, computer or machine vision as used herein includes methods and systems for acquiring, processing, analyzing, and understanding images and, in general, data from the real world in order to produce numerical or symbolic information that can be used to generate, for example, a representative signal, as is generally known in its industry. These systems typically include the necessary optics, sensors, and mechanisms, along with a controller (e.g., a computer appropriately programmed), to determine the state of a membrane surface and to trigger or otherwise carry out any action necessary in response to the state of the membrane surface. More specifically, the means for identifying a physical characteristic can include the appropriate optics (including, for example, magnification capability) to carry out image capture and processing, pattern recognition, signal processing and the algorithm to determine a course of action based on the results of the visual inspection. Additional identifying means include various electro-mechanical systems for, for example, pressurizing the membrane (e.g., a reverse osmosis module), tensioning the membrane, exposing the membrane to varying temperatures, or otherwise subjecting the membrane to a physical stimulus.

The means for exposing the membrane surface to at least one substance includes, for example, a tank or other receptacle for at least partially submerging the membrane within a solution containing the at least one substance. This process may be carried out manually or automatically with the appropriate mechanisms (e.g., clamps, belts, linkages, motors, electrical controls, etc.). Additional exposing means include a spray coater, a pressure/flow cell such as an osmotically driven membrane system or a stand-alone test stand, or a conventional membrane manufacturing line modified to include additional stages as necessary. In an embodiment using a pressure/flow cell, the cell is configured to hold the membrane in place and introduce the at least one substance via a solution (e.g., a feed stream or draw solution) that flows through the flow cell and comes into contact with the exposed surface of the membrane. In other embodiments, the system uses a coating device as the means for exposing the membrane surface to at least one substance. The at least one substance can be applied to the membrane surface with a spray coater, including a tank for containing the at least one substance (e.g., in a solution within the tank), a pressure device, and a nozzle, as is known in the art, or a vapor deposition machine. Other types of coating devices are contemplated and considered within the scope of the invention, for example, ultrasonic spraying. In various embodiments, such as where the at least one substance is delivered via a solution, the solution may be include at least one of water, alcohol, hydrophobic solvents (e.g., hexane), aprotic solvents, non-polar solvents, or polar solvents (e.g., water or alcohol) with the desired substance to be delivered.

In yet another aspect, the invention relates to a system for improving performance of a membrane in an osmotically driven membrane system. The system can include a forward osmosis membrane having a permeate side and a retentate side, a source of a feed solution in fluid communication with the retentate side of the forward osmosis membrane, a source of a draw solution in fluid communication with the permeate side of the forward osmosis membrane, and means for exposing at least one side of the membrane to at least one substance to promote the modification of at least a portion of a surface of the forward osmosis membrane. The means for exposing at least one side of the membrane include at least those exposing means described above.

In various embodiments of the foregoing aspect, the exposing means include electro-mechanical apparatus for introducing, either manually or automatically, the at least one substance into the source of feed solution, the source of draw solution, or both. These apparatus, or means for introducing, include such mechanisms as a receptacle or other opening in a chamber holding the feed solution or the draw solution or a housing containing the membrane, along with any necessary valves, piping, controllers, etc. as necessary. In one embodiment, the at least one substance can be added via a hopper with a metering device (e.g., a valve, a motorized auger in the hopper, or some type of injection device) that can introduce the at least one substance in a controlled manner. The at least one substance can be introduced in, for example, a liquid or powder form. The means for introducing the at least one substance can also include a stirrer or similar types of equipment for mixing the at least one substance within the selected solution for relatively even dispersal. The means for introducing the at least one substance can also include a control system with associated sensors, switches, and valves that can monitor a state or characteristic of any of the draw solution, the feed solution, or the membrane (e.g., flux rate, surface charge, concentration levels, pH, solution temperature, flow rates, etc.) and control the introduction of the at least one substance based, for example, on the measured state or characteristic.

In various embodiments, the at least one substance can be introduced continuously or intermittently. In some embodiments, the at least one substance can be introduced repeatedly in a plurality of steps having equal or varying parameters (e.g., variations in flow rates, temperatures, durations, etc.) and with or without intermediate steps (e.g., a flushing step or a setting or otherwise idle step). Also, the concentration/amount of the at least one substance introduced can be varied. For example, the system may expose the target membrane surface to a first dosage of the at least one substance to effectuate the modification of the membrane and a second dosage to maintain the modification. Alternatively or additionally, the system could expose the membrane surface to a secondary substance that can undo the first modification and/or promote a second modification to the membrane. The at least one substance can include any of the substances disclosed herein. Generally, the at least one substance preferentially reacts with, adheres to, or otherwise bonds with one or more "defects" that may be present on the membrane surface to, for example, modify at least one of a surface charge of the membrane surface, a hydrophilicity of the membrane surface, a hydrophobicity of the membrane surface, a porosity of the membrane surface, a tortuosity of the membrane, thickness of the membrane, rejection capability of the membrane, and/or a flux rate of the membrane.

In yet another aspect, the invention relates to a method of modifying a forward osmosis membrane. The method includes the steps of providing a membrane having a support layer and a polyamide based active layer disposed thereon, functionalizing the active layer to make it reactive, and exposing the functionalized active layer to at least one of a primary, secondary, tertiary or quaternary amine. In one embodiment, the step of functionalizing the active layer includes exposing the active layer to a water soluble compound comprising at least one of an aldehyde, ester, or carboxylic functionality. In some embodiments, the water soluble compound includes 4-formyl-1,3 benzene disulfonic acid disodium salt (FBS). In various embodiments, the step of exposing the functionalized active layer to at least one of a primary, secondary, tertiary or quaternary amine comprises exposing the functionalized active layer to at least one of a biguanide functionalized compound or a urea functionalized compound. In a particular embodiment, the membrane is post-treated by exposing the reactive membrane active layer to a biguanide functionalized compound (e.g., polyhexamethylene biguanide (PHMB), heterocyclic biguanide, phenformin, proguanil, polyaminopropyl biguanide, alexidine, chlorohexidine, chloroproguanil, metformin, and/or buformin) and a negatively charged counter ion (e.g., FBS or NPT) in an aqueous solution during a forward osmosis process. A variety of compounds that may be adapted for use as a post-treatment for a membrane are disclosed in Pat. Nos. 2,596,930; 2,251,234; 2,529,142; 2,525,227; 2,259,169; 2,277,480; 2,285,750; 2,628,946; U.S. Patent Publication No. 2010/0256368; and PCT Publication No. WO2009/141040; the disclosures of which are hereby incorporated by reference herein in their entireties.

In another aspect, the invention relates to a forward osmosis membrane including a support structure having a first side and a second side and composed of a polymeric material, a membrane support layer disposed on the first side of the support structure and composed of a polymer, an active layer disposed on the membrane support layer and composed of a semipermeable, three-dimensional polymer network having a thickness of less than 200 nm, and a functional layer composed of an amino-epoxide compound reacted with the active layer to form the functional layer thereon.

In yet another aspect, the invention relates to a method of making a forward osmosis membrane. The method includes the steps of providing a support structure having a first side and a second side and composed of a polymer, applying a material to the first side of the support structure to form a membrane support layer thereon, applying a barrier material to the membrane support layer to form an active layer thereon, reacting an amino functionalized compound with an epoxide compound in a solution to form an amino-epoxide compound, and exposing the active layer to the amino-epoxide compound in solution to form the forward osmosis membrane.

In various embodiments, the support structure is a bilayer substrate including first and second separable layers, wherein a top surface of the first layer corresponds to the first side of the support structure. The method can also include the step of separating the second layer of the bilayer substrate from the first layer of the bilayer substrate. In some embodiments, the step of separating the second layer of the bilayer substrate from the first layer of the bilayer substrate modifies a pore structure in the support layer. The first layer of the bilayer substrate can have a Frazier air permeability of greater than about 50 cfm/ft2 min and a thickness of less than about 2 mils. The material applied to the first layer of the bilayer substrate can have a polymer loading of between about 5 and 20 g/m².

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which:

FIG. 3 is a pictorial representation of an exemplary process for modifying a membrane active layer in accordance with one or more embodiments of the invention;

DETAILED DESCRIPTION

Figure 1A:
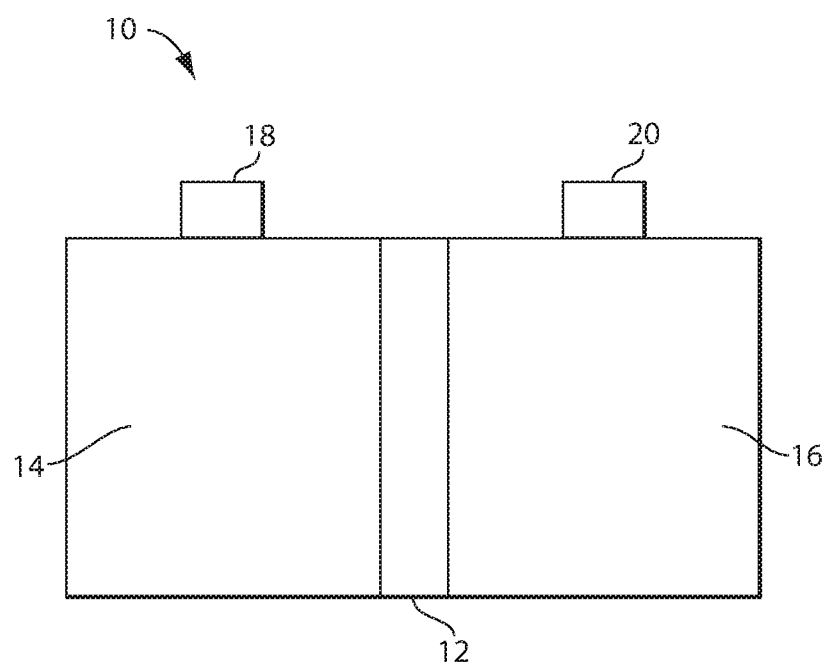
FIG. 1A is a schematic representation of an osmotically driven membrane system, where the membrane(s) are capable of self-repair or modification in accordance with one or more embodiments of the invention.

FIG. 1A depicts one exemplary osmotically driven membrane system 10. The system 10 includes a membrane system 12 that can include one or more forward osmosis membranes or membrane modules. Various membrane systems and their associated components are disclosed in U.S. Pat. Nos. 6,391,205 and 7,560,029; U.S. Patent Publication Nos. 2011/0203994, 2012/0267306, 2012/0267307, 2012/0273417, and 2014/0224718; the disclosures of which are hereby incorporated by reference herein in their entireties. Various membranes that can be used in the disclosed systems are described in U.S. Pat. No. 8,181,794 and U.S. Patent Publication No. 2014/0263025; the disclosures of which are hereby incorporated by reference herein in their entireties. The systems and methods described herein for repairing/modifying membrane surfaces can also be used on standard membranes as well.

With reference to FIG. 1A, a source of a first solution 14, also referred to as a feed solution, is in fluid communication with the membrane system 12. The system 10 also includes a source of a second solution 16 (also referred to as a draw solution) that is also in fluid communication with the membrane system 12. Typically, the membrane system 12 includes one or more membranes disposed within a chamber or some type of housing. The sources of feed and draw solutions 14, 16 can be chambers disposed adjacent a membrane module or be part of the membrane system assembly. Alternatively or additionally, the sources of feed and draw solutions 14, 16 can be located remotely and the solutions transported to the membrane system 12 via, for example, pumps, valving, and any necessary plumbing, sensors, and controls. The system 10 can further include means 18 for introducing one or more substances (alone or in a solution) to the feed solution and/or means 20 for introducing one or more substances to the draw solution. Alternatively or additionally, the membrane housing can include means for introducing the substance(s) directly to the permeate side and/or the retentate side of the membrane(s) depending on which membrane surface requires repair or modification. This introduction of at least one substance allows for the repair of an in-service element, thereby extending its life and eliminating or reducing downtime.

Generally, during operation of the osmotically driven membrane system, the membrane can become damaged (e.g., a hole created in the active layer (also sometimes referred to as the barrier layer) of the membrane by a foreign object) or its performance can degrade (e.g., fouling or excessive ion-exchange). In the case of a hole in the membrane, the flux rate will likely increase, but with it will be the passage of solutes that would otherwise be blocked by the active layer of the membrane. This scenario can usually be determined based on increased flux, increased feed solute concentration in the permeate solution, increased draw solute concentration in the retentate solution, and/or a change in feed/draw solution pressure. The standard solution to this problem has been to replace the damaged membrane, which can be costly in terms of both material and down time. However, methods and systems of the present invention can eliminate the need to replace the membrane by repairing the membrane in situ.

Similarly, in the case of performance degradation of the membrane, the membrane may need to be cleaned or replaced, again leading to costly downtime. In some cases, little can be done to improve membrane performance due to the nature of the particular membrane. One such case includes a membrane experiencing excessive ion-exchange, either due to the membrane chemistry or a change in feed/draw solution chemistry. In these cases, the present invention can be used to modify a physical and/or performance characteristic of the membrane to, for example, improve its resistance to ion-exchange or propensity to foul when exposed to certain substances.

Once the nature and location of the "defect" is determined, and this can be done by, for example, measuring feed and draw solution characteristics (e.g., solute concentration), membrane performance (e.g., water flux or salt rejection), and/or feed/draw solution pressures and flow rates, the appropriate substance can be selected to repair or modify a surface of the membrane and the particular surface(s) that need repair/modification can be determined. In some embodiments, visual inspection of the solution(s), membrane(s) or related components is also possible to determine the nature and location of any defect or the resolution thereof. In some cases, a pH or ion selective probe/meter can be used to determine the presence, nature and/or location of a defect. For example, an ion selective probe could be disposed in the draw solution, where it can sense the presence of a specific salt within the draw solution that would have fluxed across the membrane from the feed solution. The presence of the specific salt can be indicative of a hole in the membrane or a performance failure, either of which would signal the need for repair.

In addition to selecting the particular substance(s), one can determine the appropriate formulation (e.g., concentration or total amount of the at least one substance to be added), delivery mechanism (e.g., in powder form via a hopper or in solution injected into the feed line) delivery conditions (e.g., temperature or rate of introduction), where to introduce (e.g., in feed or draw solution), and/or when to introduce (e.g., whether during normal operation or scheduled maintenance). In one embodiment, the substance(s) can be introduced during or as part of an osmotic back-flush procedure, such as that described in U.S. Patent Publication No. 2014/0224718 incorporated above. In some cases, the introduction step may need to be repeated, at least partially, to restore any of the substance (and its intended repair) that may be diminished via the flushing or other cleaning procedure. For example, some membrane cleaning procedures use harsh chemicals that may negatively react with or otherwise interfere with the bonding mechanism of the at least one substance. Typically, membranes repaired in accordance with the present invention will require less frequent cleaning or flushing. Some general examples of defects and repair protocols are listed in Table 1 below. It should be noted that the specific repair protocol may be tailored to the specific system parameters, membrane characteristics and material, etc. as discussed herein.

substances can be selected to suit a particular application. Other examples include polyanions, such as carboxylate, acrylate, phosphonate, hydroxide, and all other species bearing a negative charge or with a low pKa (e.g., sulfonates); and polycations, such as a quad amine, quad phosphonates, polyamide, polyimine, quanidinium, and all other species bearing a positive charge and a high pKa (e.g., >9). Generally, the block copolymers should include both hydrophobic and hydrophilic (polar or non-polar) components.

The means for introducing the one or more substance can include a receptacle or other opening (e.g., a port and valve arrangement on one of the fluid conveying lines) through which the substance can be manually introduced. Alternatively or additionally, the substance can be introduced by other means, such as via a hopper with a metering device (e.g., a valve or other known dispensing device) that can introduce the at least one substance in a controlled manner. The at least one substance can be introduced in, for example, powder or liquid (e.g., the substance in a carrier solution) form. The means for introducing the at least substance can also include a stirrer or other types of equipment for mixing the substance, either constantly or intermittently, within the selected solution/chamber for relatively even dispersal. In some embodiments, for example where the substance is added to a fluid conveying line (e.g., piping), the mixing can be accomplished by the forces generated by the fluid flowing through the piping. The means for introducing the at least one substance can also include a control system with associated sensors and switches that can monitor a state or characteristic of any of the draw solution, the feed solution, and the membrane (e.g., flux rate, concentration, or material) and control the introduction of the at least one substance until a desired result (e.g., a hole eliminated or a functional characteristic altered) is achieved; based, for example, on a measured state or characteristic.

TABLE 1

| Nature of Defect | Class of Substance | Mode of Delivery | Delivery Point |
|---|---|---|---|
| Pin hole in active layer | Block copolymer with hydrophilic and hydrophobic block or long chain hydrophilic polymer. | Dispensed in liquid solution in-situ. Post-modification during casting or with completed element. Vapor deposition/spray coating. | System feed (ideally pressurized). System draw. During casting. |
| Poor rejection | Quad amine/polycation and/or polyanion; block copolymer. | Dispensed in liquid solution in-situ. Post-modification during casting or with completed element. Vapor deposition/spray coating. | System feed. (via RO or FO operation). During casting. |
| Abrasion | Polar or non-polar hydrophilic polymer; block copolymer. | Dispensed in liquid solution during operation. | System feed |
| Hole/damage to support layer | Hydrophobic polymer; block copolymer; non-polar hydrophilic polymer. | Dispensed in liquid solution in-situ. Post-modification during casting or with completed element. Vapor deposition/spray coating. | System feed. System draw |
| High reverse salt flux | Polycation; polyanion; block copolymer. | Dispensed in liquid solution during operation. | System feed. System draw |
| Poor flux | Hydrophilic polymer; polar or non-polar block copolymer. | Dispensed in liquid solution in-situ. Post-modification during casting or with completed element. Vapor deposition/spray coating. | System feed. System draw |

Referring back to FIG. 1A, the substance can be added to one or both sides of the membrane 12 via the means for introduction 18, 20 disposed on or coupled to the membrane module and/or feed and draw chambers. In at least one embodiment, the substance added is a block copolymer containing a hydrophobic and hydrophilic tail, such as polystyrene and a polyanion or polycation; however, other In one or more embodiments, the specific means for introducing the at least one substance will be selected to suit a particular application; for example, the nature of the substance to be introduced, the location of the defect, and the conditions under which the introduction is affected. Other introduction/delivery parameters include the dosage (e.g., introductory or steady-state concentration levels, rate of introduction), ambient conditions (e.g., temperature and humidity level), solution conditions (e.g., chemistry, temperature, pH, flow rate of the feed or draw solution), the nature of the membrane (e.g., active layer material and orientation), and time (e.g., interval and duration of the introduction or rate of introduction).

In one exemplary embodiment, the osmotically driven membrane system is a forward osmosis system and the membrane is oriented with the active layer towards the feed solution. The control system monitors the operation of the forward osmosis system and once it determines the presence of a defect, it triggers a repair process according to a set protocol. For example, the control system determines that there is an increase in flux across the membrane along with a corresponding decrease in salt rejection, which in some cases indicates the presence of a hole in the active layer of the membrane. In some cases, if the salt rejection did not decrease, there may be a hole on the support side of the membrane. The system may also be able to determine relative size of the hole based on the extent of the flux increase, salt rejection decrease, and/or other operating parameters, such as differential pressure across the membrane, which informs the particular protocol to be selected. In this example, the system determines that there is a series of small pinholes in the membrane and calls for the introduction of a block copolymer or other substance(s) (e.g., a polysulfone-polyamide block copolymer) into the feed solution. Specifically, the at least one substance is initially introduced at a concentration of about 10-1000 ppm, preferably 50-500 ppm, and more preferably 70-300 ppm for a duration of about 10 minutes to about 8 hours, or until the system determines that the hole(s) are no longer present via, for example, measurements of flux and salt rejection that determine the system is back within normal operating conditions. In some embodiments, once the repair is affected, the system may continue to call for the introduction of a lower dosage of the at least one substance to maintain the repair and/or call for the introduction of a second substance to complete or otherwise further enhance the repair (e.g., reinforcing the bonding mechanism of the repair). The entire process, or any subset of steps thereof, may be carried out manually or automatically.

Figure 2A:
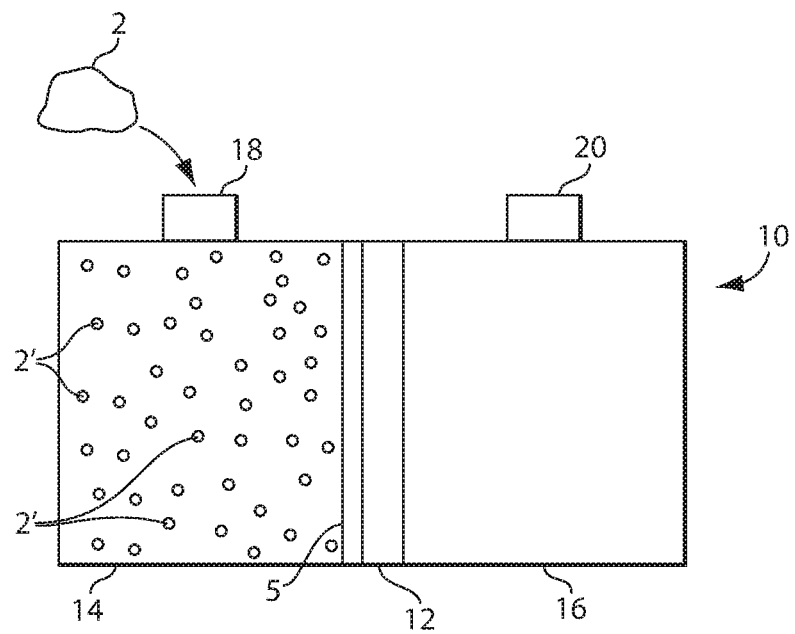
FIGS. 2A-2C are enlarged, partial cross-sectional views of an osmotically driven membrane system and a self-repairing membrane in accordance with one or more embodiments of the invention
Figure 2B:
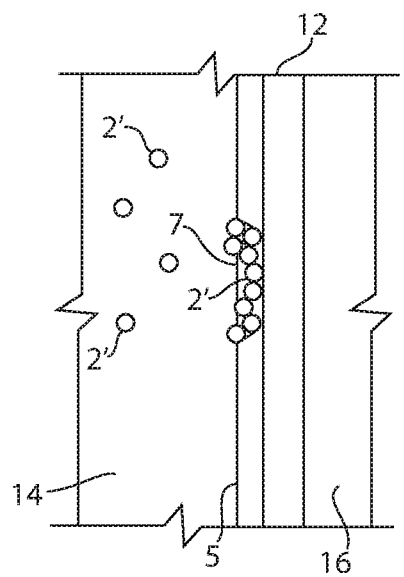

FIGS. 2A and 2B generally depict the various agents of action that are occurring in the osmotically driven membrane system and to its associated membrane. As shown in FIG. 2A, the substance 2 is added to the feed 14 chamber in liquid form (e.g., nanoparticles of the at least one substance suspended in a carrier solution) via the introducing means 18. The various nanoparticles 2' of the substance 2 disperse through the feed solution 14 and are drawn to the defect 7 in the surface of the active layer 5 of the membrane 12. In the case of a defect extending through the membrane, the at least one substance can be added to the solutions on both sides of the membrane to repair both the active layer and the underlying support layer(s).

Typically, the at least one substance 2 includes both hydrophilic and hydrophobic chains that can be selected to have various/specific properties for repairing/enhancing a membrane surface. For example, the substance can be selected to have properties that allow it to "stick" to relatively hydrophobic surfaces without the need for chemical attachment. Generally, the substance bonds to the defect/membrane surface via non-specific Van der Waals interactions; however, other bonding mechanisms are contemplated and considered within the scope of the invention, such as covalent attachment (e.g., carbodiimide linking), ionic attachment, etc. The non-specific Van der Waals forces cause the nanoparticles to adhere to the membrane in the areas of the defects/damage preventing ion permeation from a feed solution to a draw solution and/or vice-versa depending on whether the active layer and/or support layer are repaired (e.g., a polyamide active layer and a polysulfone support layer). In the current example shown in FIG. 2B, the substance molecules 2' attach themselves to the edges of the "hole" 7 and each other, thereby gradually filling the hole in. Although it may appear that the substance is closing the hole off entirely, the substance 2 also contains a hydrophilic segment that allows for continued water flux through the repaired section of the membrane 12. In various embodiments, the substance 2 may be introduced via a pressurized solution or under vacuum. For example, the substance 2 can be introduced via the feed or draw solution and that solution can be introduced to the membrane module under pressure, so as to effectively operate the membrane in reverse osmosis mode.

In addition to repairing membranes, the introduction of the various substances disclosed herein can also be used to improve other functions of the membranes, such as fouling resistance, wet-out, hydrophilicity, hydrophobicity, salt rejection, flux through the active and/or support layers, oxidation resistance, and the ability to mitigate metal complexation issues by, for example, applying the substance to the entire (or at least substantially entire) surface of the membrane surface via forward osmosis operation. Various examples are described further hereinbelow.

In one exemplary embodiment, the membranes within the osmotically driven membrane system may require the addition of certain chemicals to prevent the degradation of the membrane. For example, certain active layer chemistries are prone to oxidation in the presence of certain chemicals, such as oxygen and radical initiators, which require the introduction of anti-oxidants, such as sodium bisulfite (SBS), to the feed solution. By introducing radical initiators in the presence of acrylate monomers (e.g., methacrylate) this can promote/enhance oxidation, which would induce additional polymerization of the existing active layer resulting in a permanent modification of the active layer, thereby rendering it no longer susceptible to oxidation and eliminating the need for additional costly chemicals. Generally, the active layer is built up improving salt rejection and eliminating oxidation sites. This process may also eliminate the need for additional coatings to improve selective permeability described herein. The substance (e.g., cationic methacrylate, anionic methacrylate, and/or zwitterionic methacrylate) can be added via any of the mechanisms described here.

In another exemplary embodiment, the osmotically driven membrane system is again a forward osmosis system operating under a set range of operating conditions, for example, a feed solution having a TDS range of 25,000-125,000 PPM and a draw solution having a 2-6 molar concentration of ammonium bicarbonate (or similar osmotic draw solution), where the system is attempting to concentrate the feed to a TDS of >185,000 PPM. The system can include a sensor (e.g., a conductivity probe) to monitor the concentration of the feed solution introduced to the membrane. If the system senses that the feed concentration has exceeded the expected TDS range, it can determine whether the membrane, in its present physical condition, can handle the increased TDS feed. Once it is determined that the present configuration of the membrane is no longer suitable for the system operating conditions, the system registers the presence of a "defect" in the system as presently configured, which in turn triggers the introduction of the at least one substance. In a particular embodiment, the trigger can include generating an indicator or alarm (e.g., a light on a control panel) that prompts an operator to introduce the at least one substance according to the appropriate delivery protocol (e.g., substance, dosage, etc.). Alternatively, the trigger can be a signal that actuates any combination of controls and valves to automatically introduce the at least one substance according to the appropriate delivery protocol. Again, any of the various steps can be carried out manually or automatically. In automated embodiments, for example, the control system can include the necessary programming and control logic to receive the various sensor inputs (e.g., solution concentrations, pH, temperatures, pressures, flow rates, flux rates, etc.) and/or fixed inputs (e.g., membrane type and material) to determine the presence and nature of the defect and identify an appropriate substance to be introduced and the appropriate delivery protocol.

Figure 2C:
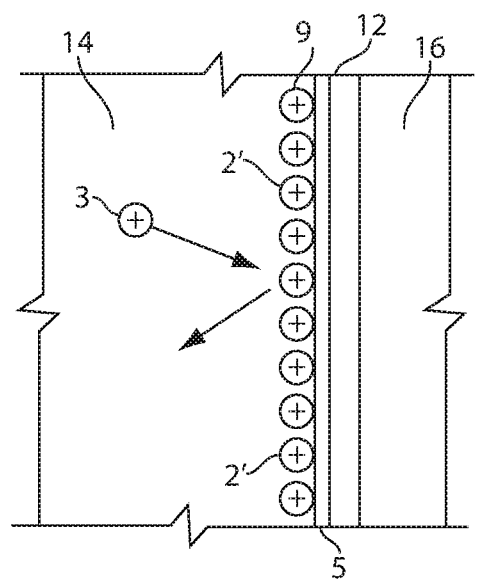

In the preceding example, the increased TDS concentration in the feed can cause additional solutes to flux through the membrane, which would necessitate the "repair" of the membrane active layer (e.g., to improve rejection, for example, increasing chloride rejection from 85% to 98%). One such repair includes introducing a substance that can adhere to the surface of the active layer of the membrane to change an operating characteristic thereof. In a particular embodiment, the substance added is benzalkonium chloride (BAC) and/or a biguanide complex; however, other substances, such as those described elsewhere herein can be used to suit a particular application. In one example, the addition of the substance changes and/or enhances an existing charge on the membrane active layer that assists the membrane in rejecting various ionic solutes. For example, a set or variable amount of the substance may be added to the feed solution at a rate as necessary to effectuate the repair. Generally, the amount and rate of introduction of the substance will be selected to suit a particular application and be based, at least in part, on the solution chemistries, the nature of the repair, the material and surface area of the membrane, the manner of delivery, and the nature of the substance itself. FIGS. 2A and 2C depict some of the various agents of action that are occurring in the osmotically driven membrane system and its associated membrane.

As shown in FIG. 2A, the substance 2 is added to the feed 14 chamber in liquid form (e.g., nanoparticles of the at least one substance suspended in a carrier solution of any suitable solvent, as disclosed herein) via the introducing means 18. The various nanoparticles 2' of the substance 2 disperse through the feed solution 14 and are drawn onto the surface of the active layer 5 of the membrane 12. As previously discussed, the substance(s) 2 can include both hydrophilic and hydrophobic chains that bond to the membrane surface via non-specific Van der Waals interactions. However, as discussed above, other bonding mechanisms are contemplated and considered within the scope of the invention. Generally, the substance will form a film or coating 9 over at least a portion of the membrane surface and in some cases substantially the entire surface. The amount of surface coverage possible can be controlled based, at least in part, on the nature of the substance, the dosage, the operating conditions, and any pretreatment of the membrane. Typically, one would want to cover substantially the entire surface in the present example. Generally, the substance will add a very thin layer 9 of positively charged particles to the active layer. The layer 9 is sufficiently thin to have a negligible effect on the membrane flux, but provides a sufficient amount of charge to repel the additional salt ions 3, as shown in FIG. 2C. In other embodiments, the layer 9 comprises negatively charged particles. Additional protocols may include depositing multiple layers, for example, introducing layers having alternating charges (e.g., (+)(−)(+), etc.).

It is also possible to introduce additional substances to assist the repair or otherwise enhance the operation of the membrane. For example, an anti-scalant can be introduced to the feed solution with the at least one substance. Another substance that can be introduced is a catalyst or reagent that can cause the additional or just certain solutes to precipitate out of the solution into which the substances are added. Additionally, one or more substances can be added that react with the chemistry of the feed and/or draw solutions. For example, the substance can react with a chemical, such as a polyelectrolyte, within the feed solution to create the end substance necessary to effectuate the repair.

As opposed to just enhancing the repair, a secondary substance can be introduced to reverse the repair. For example, where the feed chemistry has returned to its expected composition, a substance can be added to effectuate or hasten the removal of the initial substance introduced. Essentially, any number of substances and their sequence of introduction can be customized to achieve a specific "repair" or series of "repairs." Additionally, it should be noted that the preceding description did not specify a membrane configuration (e.g., spiral wound or plate and frame); however, the invention as described herein can be used with any type of membrane configuration and any number of membrane modules. For example, the osmotically driven membrane system may use a plurality of spiral wound membranes in a pyramidal arrangement. In this case, it may be necessary to have multiple points of introduction into the system to repair one or more membranes. Additionally or alternatively, it is possible to have introduction means associated with each membrane module so that any given membrane can be repaired or otherwise have its performance customized by the introduction of any specific substance or combination of substances.

Once the membrane has been exposed to the substance according to the appropriate delivery protocol, the defect will be repaired (e.g., the hole in the active layer will be eliminated or a performance characteristic modified). The repair/modification can be confirmed by the same means discussed above for determining the presence and nature of the defect. As previously discussed, a different substance and/or a different delivery protocol may be enacted to maintain the repair/modification. Generally, any excess substance that does not adhere to the membrane surface or otherwise modify the membrane surface may exit the osmotically driven membrane system within the concentrated feed solution and/or the diluted draw solution, depending on where the substance is introduced. In some embodiments, the excess substance can be recovered therefrom. In one or more embodiments, the exit streams can be monitored to determine the status of the inventive process and whether the repair/modification is complete and/or if the introduction of the substance needs to be modified (e.g., more or less substance required or other parameter needs adjustment, such as the temperature or rate of introduction). In some embodiments, the process needs to be repeated where the substance may be gradually lost during normal operation of the system. For example, if the system again senses an increase in flux, this may be the result of new damage or a reopening of the holes previously repaired, which would require rerunning the process.

Figure 1B:
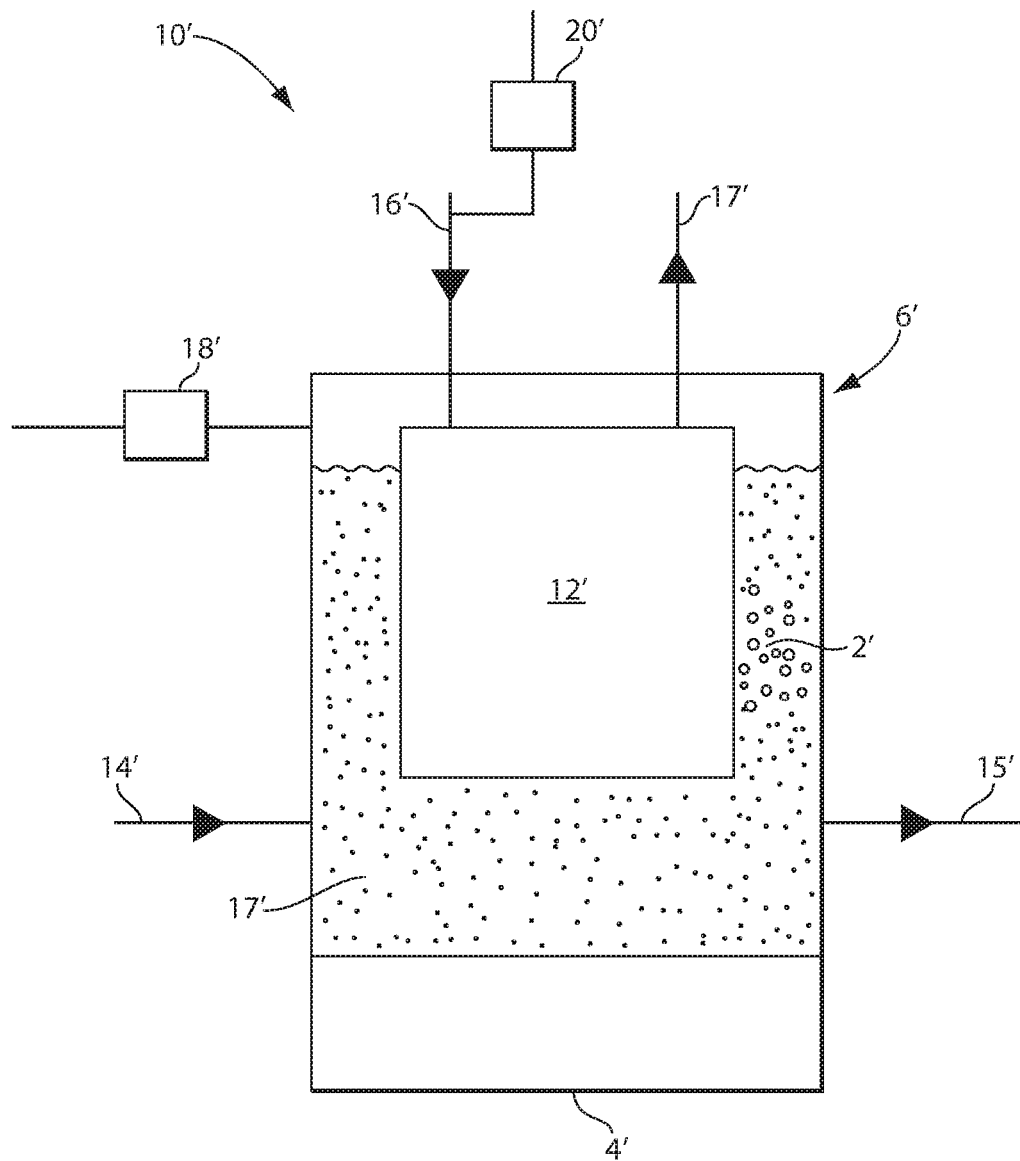
FIG. 1B is a schematic representation of an alternative osmotically driven membrane system, where the membrane(s) are capable of self-repair or modification in accordance with one or more embodiments of the invention.

FIG. 1B depicts an alternative embodiment of an osmotically driven membrane system 10' that can be subjected to the methods of the present invention to repair or modify a membrane contained therein. Specifically, the embodiment depicted includes an "open" type system that includes a membrane module 12' that may be immersed or placed within an enclosed assembly 4' (e.g., an open or closed tank). As shown in FIG. 1B, the membrane module 12' is in fluid communication with a feed solution stream 14' and a draw solution stream 16', where the enclosure 4 is configured for receiving the feed solution; however, the enclosure 4' could also be configured for receiving the draw solution in certain embodiments. The membrane module 12' can be in a spiral wound or plate and frame configuration. In one embodiment, the membrane module 12' is a plate and frame type cassette module holding multiple membranes arranged so that the retentate sides of the membranes are exposed to a feed solution pumped through the tank and the permeate sides of the membranes are exposed to a draw solution pumped or drawn through the cassettes. Similar to the system of FIG. 1A, the system 10' also outputs a concentrated feed solution 15' and a dilute draw solution 17'. The system 10' also includes means 18', 20' for introducing the at least one substance to the retentate and/or permeate side of the membrane 12', which are similar to those described above. Alternatively or additionally, the means for introducing 18', 20' the substance can include a porting arrangement (e.g., a valve and/or fitting) disposed on the plumbing introducing the feed or draw solution to the membrane 12'. The porting arrangement(s) can be used for injecting the substance into the system 10' (e.g., dissolved within a carrier solution).

Generally, the inventive concepts disclosed hereinabove with respect to FIG. 1A can be similarly applied to the alternative system 10' of FIG. 1B. Specifically, an associated control system can be used to determine the presence of a defect and the nature thereof. This can be accomplished by any of the means disclosed herein, for example, any combination of sensors, valves, control logic, etc. Visual inspection is also an option when the invention is applied to an open type system. Once the defect is identified, an appropriate substance or substances are selected for introduction to a surface of the membrane and the repair is effectuated as discussed above. An open type of arrangement may make it easier to introduce the substance to the membrane module via introduction into the tank in which all of the membranes may be disposed, which can be beneficial when the application calls for repairing all of the membranes within the tank (e.g., for modifying a performance characteristic of all of the membranes). Additionally or alternatively, the cassettes can include means for introducing the at least one substance to a single membrane or a subset of membranes, for example, where a limited number of membranes are damaged (i.e., have a hole in an active layer that requires repair).

In a particular embodiment, the modification involves the exposure of the active layer to a water soluble compound, in particular a bulky water soluble compound (generally, a bulky compound would include anything bigger than a benzene with a sulfonate group), with an aldehyde, ester, or carboxylic functionality, such as 4-formyl-1,3-benzene disulfonic acid (other examples of water soluble compounds generally include molecules with an aldehyde and/or carboxylic acid and/or molecules having sulfonate or phosphate groups, such as 4-formyl benzoic acid, formyl-4-hydroxy-benzoic acid, glyoxal, phosphorylated serine, methyl ester sulfonate), alone or in the presence of a biguanide functionalized molecule or a urea functionalized molecule. Generally, the water soluble compound will make the active layer more reactive and ready to form bonds with the biguanide functionalized molecule or the urea functionalized molecule, permanently adhering them to the active layer. The added molecules may cross-link the pores of the active layer making the pores tighter and the membrane more selective. In some embodiments, a di- or tri-aldehyde is first reacted with the membrane surface (e.g., a support or barrier layer) and then a polymeric biguanide (or other amine) is reacted with the aldehyde to improve the performance of the membrane. The reactions are preferably performed in an acidic environment. Examples of di- and tri-aldehydes include benzene-1,3,5-tricarboxaldehyde, formaldehyde, isophthalaldehyde, 2,6-pyridinedicarboxaldehyde, terephthalaldehyde, 2,5-thiophenedicarboxaldehyde, glutaric dialdehyde, sodium nitromalonaldehyde monohydrate, and 2,2'-trimethylenebis-1,3-dioxolane.

FIG. 3 depicts an exemplary embodiment of how the process works. Generally, the nitrogen alpha to the carbonyl or imine will use its free electron pair to create a bond with the aldehyde, turning the aldehyde into an alcohol. The substituent attached to the nitrogen weakens the bond between that nitrogen and the carbon of the imine. The weakening is caused by a disruption of the planarity of the nitrogen's lone pairs and the carbonyl/imine orbitals. This creates an isocyanate if the nitrogen is alpha to a carbonyl or an N=C=N if the nitrogen is alpha to an imine. The reaction of the isocyanate and/or N=C=N to the active layer or a biguanide functionality will increase the connectivity of the active layer, which effectively shrinks the overall pore size of the active layer, thereby improving the active layer's selectivity. See, for example, *Dynamic Urea Bond for the Design of Reversible and Self-Healing Polymers*, Ying et al., Nature Comm. 5, Article 3218, Feb. 4, 2014; the disclosure of which is hereby incorporated by reference herein in its entirety.

In the foregoing, the introduction of the water soluble substituent causes the reformation of the active layer. However, the resulting functional group is also very reactive with the nitrogen in the polyamide or polyamide-urea active membrane layers and biguanides or other similar compounds. For example, the carbon in the middle of the double bonds is nucleophilic and will readily accept electrons from the nitrogens in the polyamide/polyamide-urea active layer and the biguanides exposed thereto, thereby permanently bonding the biguanide molecules to the pores of the active layer and further improving membrane selectivity.

In a particular embodiment, the water soluble substituent, alone or with a biguanide or similar compound, can be introduced to the membrane active layer by soaking the membrane in a bath containing those compounds. Alternatively, the membrane can be post-treated in place using one of the processes described in U.S. Patent Publication No. 2015/0136676, the disclosure of which is hereby incorporated by reference herein in its entirety. Generally, the membrane can be operated in forward osmosis mode with a feed solution containing various substituents to be introduced to the active layer side of the membrane, while a draw solution is introduced to the opposite side of the membrane. In various embodiments, the substituents include a biguanide or a blend of biguanides (e.g., polymeric hexamethylene biguanide) in combination with an anionic species, such as sodium citric acid, trisodium naphthalene trisulfonic acid, 4-formyl-1,3-benzenedisulfonic acid disodium salt, or combinations thereof. In various embodiments, the draw solution includes one or more of ammonium carbonate, potassium carbonate, or sodium chloride, buffered to a pH between 9 and 11. The membrane may be exposed to this process three or more times, with or without a rinse step in-between each exposure (e.g., a 50 g/L sodium chloride solution on the feed side).

Generally, this post-treatment of the membranes improves membrane performance and/or extends the life of the membrane in various osmotic applications, for example, improving membrane rejection in forward osmosis applications. The post treatment can also improve/reduce the reverse flux of ions from one side of the membrane to the other, for example, from a draw solution to a feed solution. In one embodiment, the post treatment coating of the membrane was able to withstand washing at pH 3-12. Additionally, the coating chemistries disclosed herein allow for extremely high salt rejections (e.g., 99.7%) when operated with a NaCl feed solution with a 50,000 ppm concentration and a 1.8 M ammonium carbonate draw solution.

In one or more embodiments, the coating chemistry includes low concentrations of PHMB and FBS in an aqueous phase that can react with each other according following equation:

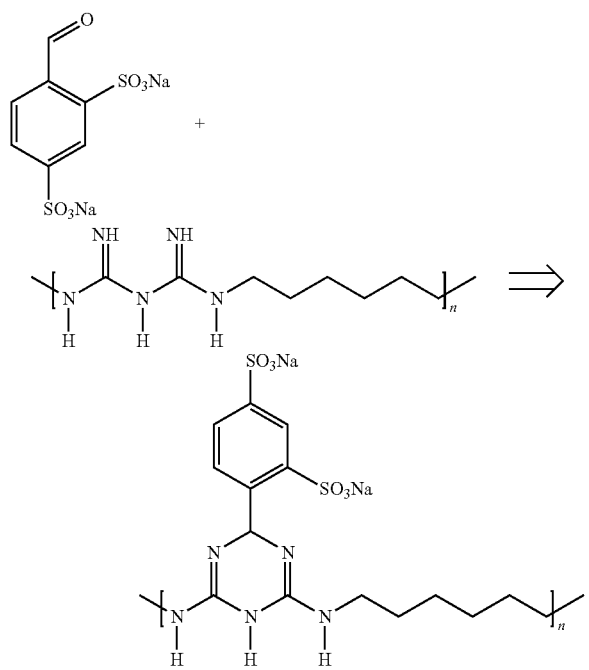

After mixing the PHMB with the FBS, the membrane surface to be treated should be immediately exposed to the solution. In one embodiment, the above chemical reaction will accelerate when the ammonium salt from the draw side of the membrane back diffuses to the feed (i.e., coating) side and the pH increases to about 10-11. The draw solution draws the PHMB, FBS and their reaction product onto the membrane surface, where the coating mixture will precipitate onto the surface of, for example, the active layer of the membrane forming a substantially uniform film. The FBS and PHMB may continue to react on the membrane surface, for example binding the biguanide to the active layer by the FBS. Typical active layers are made mostly from aromatic polyamides with carboxylic and amine end groups. These end groups form ionic and/or hydrogen bonds with the PHMB and the FBS and their reaction product. In some cases, the FBS benzene ring may stack with a benzene ring of the active layer. The formation of the film on the active layer of the membrane improves salt rejection of the membrane in forward osmosis mode with minimal impact on membrane flux. The impact on flux can be further minimized by carrying out the treatment process at a low temperature, such as 0-25 degrees C., preferably 5-20 degrees C., and more preferably 10-18 degrees C.

In one example, a membrane produced in accordance with U.S. Pat. No. 8,181,794 was placed in a flow cell configured to pass a first or feed solution along one side of the membrane (in this case, a polyamide active layer) and a draw solution along the opposite side of the membrane (in this case a polysulfone or polyethersulfone support side). The initial sodium rejection and water flux of the membrane was measured by running a 50 g/L NaCl solution as the first solution and a 1.8M [carbon] ammonium carbonate solution as the draw solution for approximately one hour, with flow rates of 0.2 LPM and 0.5 LPM for the feed and draw solutions, respectively. The membrane was then flushed with reverse osmosis water until water conductivity was below 0.1 mS. The active layer was then exposed to a feed solution containing PHMB and a negatively charged organic counter ion and a draw solution buffered to a pH of between 7 and 11 on the support side of the membrane, again with flow rates of 0.2 LPM and 0.5 LPM for the feed and draw solutions, respectively. In between each round of coating, the membrane was exposed to 2.5 M HCl solution on the feed side without any draw solution on the draw side. The membrane was exposed to the coating solution for about 10-30 minutes and the rejection was maximized after 3 rounds of post treatment. The sodium rejection and water flux of the membrane post treatment was measured by running 50 g/L NaCl solution on the active layer side and a 1.8M [carbon] ammonium carbonate draw solution on the support side for one hour, with flow rates of 0.2 LPM and 0.5 LPM for feed and draw solutions, respectively.

Coating the membrane three times for 30 minutes each time at ambient temperatures with varied concentration ratios of PHMB to sulfonated aldehyde (0.66 to 1.33) resulted in an average sodium rejection of 99.6% (some as high as 99.7%) and a drop in flux of about 50%. Coating the membrane three times at 15 minutes each time with a feed solution with 30 ppm FBS and 30 ppm PHMB at ambient temperatures resulted in a flux drop of 45% and an average sodium rejection of 99.5%. When the coating was done in cold temperatures (e.g., 10-18 degrees C.), the sodium rejection was 99.4% with a flux drop of 30%. (The draw used in coating was always 3M [C] ammonium carbonate with an N:C ratio of about 2.3:1)

The size and composition of the substance(s) to be introduced to either effectuate the repair or enhance the overall performance of the system will ideally include substances having a large molecular weight (MW) to, for example, provide better adhesion to the membrane or less water solubility and a charge; however, other types of substances are contemplated and considered within the scope of the invention and will be selected to suit a particular application. Such materials include: polyacrylates; primary, secondary, tertiary or quaternary amines (e.g., arginine); polycarboxylates; phosphonates; dimethicone; imidazole; indazole; polyethylene glycol; polyethyleneimine; heavy metals; organics (e.g., humics, mineral oil, alginates); and combinations thereof. Other potential critical variables for selecting the substance include pKa, the specific combinations (e.g., blends of substances), pH, dosages, temperatures, membrane compatibility, feed chemistry polyelectrolytes, etc. As previously discussed, the amount of the substance introduced and the delivery protocol will be selected to suit a particular application. However, in one exemplary embodiment, the system 10' operates at a 0.5 gpm feed in and the substance can be introduced at a rate of about 30-100 ml/hr. However, the rate of introduction can be scaled with the in-flow and selected to suit a particular application.

So far, the invention has been described in terms of repairing or modifying membranes that are in-service. However, it is also possible to utilize the inventive systems and methods to repair or modify finished membranes prior to use. In some cases, it is not possible to identify a defect caused in a membrane during the manufacturing process until after the membrane has been completely manufactured, and often not until it has been exposed to a fluid under pressure. In those cases where a defect is identified, the membrane is typically discarded, as most repairs are not practical. Accordingly, in alternative embodiments, the present invention can be used to repair a membrane that has incurred a manufacturing defect prior to putting the membrane in service. For example, the repair can be carried out on a membrane that has failed a quality control inspection (e.g., a visual inspection or an unacceptable performance test) or an assembled membrane can be repaired or modified if its initial performance falls short of expectations (e.g., during system start-up or on completion of assembly within a module not yet installed) (see FIG. 4).

Figure 4:
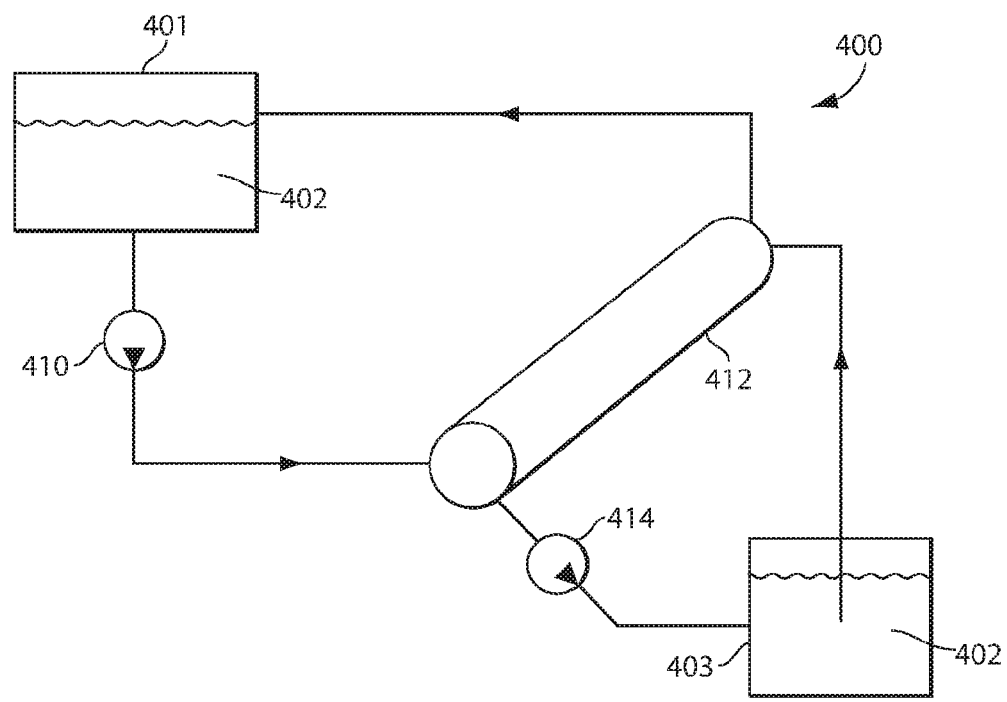
FIG. 4 is a schematic representation of one exemplary method of repairing/modifying a membrane surface after the manufacturing and assembly of a membrane module in accordance with one or more embodiments of the invention.

FIG. 4 depicts a system and method 400 for repairing a membrane. Depending on the nature of the defect, it may be advantageous to perform the repair with the membrane module in an assembled configuration. As shown in FIG. 4, for example, the membrane can be at least partially assembled as a spiral wound membrane module such that the at least one substance can be delivered to the membrane surface in need of repair via a pressurized solution or under vacuum. The at least one substance can be delivered to the membrane (active and/or support side) by operating the module in an FO or RO configuration. As shown, the membrane module 412 is in fluid communication with a source of solution 401 containing the at least one substance 402, which can be delivered to the membrane 412 via a pressure transfer device 410. In some cases, the membrane is assembled and tested prior to installation in an osmotically driven membrane system. For example, if during the test (e.g., a RO flux test) the flux is determined to be too high, it is possible that there is a hole in the membrane, which can be repaired by introduction of the at least one substance to the damaged membrane surface, thereby effectuating the repair prior to putting the module in service and salvaging the membrane. In some embodiments, the module 412 includes multiple membrane elements disposed within a housing to form the module 412. In such embodiments, the operating parameters (e.g., concentration, flow rate, pressure, etc.) will be adjusted to suit the particular application (e.g., number, size, and orientation of the membrane elements). This is generally necessary to account for system flux (i.e., the loss of solvent from the feed) and any related impacts on the coating process (e.g., degree of deposition).

In one or more embodiments, the system can be run in FO mode (either as the osmotically driven membrane system in operation or as a separate testing/coating system. As shown in FIG. 4, the system 400 includes a source of concentrated draw solution 403 for providing an osmotic pressure differential across the membrane to facilitate the modification of the membrane. In some cases, the concentrated draw solution 403 is introduced to the membrane module under pressure or vacuum via a pressure transfer device 414. In some embodiments, the concentrated draw solution 403 can also include the at least one substance 402 or an alternative substance that may aid in the repair of the membrane.

In an exemplary embodiment, one or more membranes can be modified via the system of FIG. 4, where the system 400 may be operated in an alternating FO mode to modify both sides of the membrane or operated directly to modify just one side of the membrane. For example, an active layer side of a standard nanofiltration membrane having a high flux may be modified to improve its selective permeability to make it useful as a forward osmosis membrane. In some embodiments, the system 400 is operated repeatedly to effectuate multiple modifications to the one or more membranes. The one or more membranes can be installed within a single housing or vessel, which can hold the one or more membranes in a series or parallel orientation, or the membranes can be installed in multiple housings, which in turn can be plumbed in series or parallel. In one exemplary embodiment, four 8040 spiral-type finished membrane elements are installed in a single vessel within the system 400, where multiple vessels may be included and operated in parallel and the exemplary flows can be multiplied for multiple vessels. In addition, the exemplary flows may also be adjusted to account for the number of leaves within the membrane element and the lengths of elements.

In operation, a feed solution 401 is directed to the module 412 under pressure (e.g., about 10-200 psi, preferably about 50-150 psi, and more preferably about 80-100 psi), at a desired flow rate (e.g., about 2-10 gpm, preferably about 4-8 gpm, and more preferably about 5-6 gpm), and at a desired temperature (e.g., about 10-50 degrees C., preferably about 20-40 degrees C., and more preferably about 25-35 degrees C.), although the specific operating parameters will depend, for example, on the number and size of membrane elements being "repaired," the ambient conditions, the nature of the repair to be performed, and the substance used. Additionally, the feed solution 401 can be introduced intermittently or continuously via a recirculation tank and the operating parameters can be varied between coating steps as necessary. The feed solution 401 may include certain solutes along with the desired repair/coating substances. In one embodiment, the solution 401 includes about 10,000 to 150,000 ppm, preferably about 25,000 to 100,000 ppm, more preferably about 40,000 to 60,000 ppm of a salt (e.g., NaCl, SBS, or other sodium-based salt) in addition to the at least one substance. In other embodiments, the solution includes about 10-1000 ppm of the at least one substance, preferably about 50-500 ppm, and more preferably about 200-300 ppm in RO water, although deionized or other sources of water (including brine) may be acceptable. In some cases, for example where multiple treatment steps are carried out, different composition solutions 401 can be used for each step. In the exemplary embodiment, the solution 401 includes at least two substances: a polymeric biguanide as the first substance and either NPT or FBS, or both, as the second substance. In some embodiments, the repair or coating solution will include an optional anionic salt, although the salt may be introduced during an intermediate rinse step. In some embodiments, the additional salt is added in the same or substantially the same concentration as the at least one substance. In addition, the pH, flow rate, concentration of the solution can also be varied to suit a particular application. In the exemplary embodiment, about 300 ppm of the polymeric biguanide is introduced at a rate of about 1-3 L/hr, preferably about 1.5-2 L/hr, while about 100 ppm of the second substance is introduced at a rate of about 1-5 L/hr, preferably about 2-3 L/hr.

A draw solution 403 is introduced to the opposite side of the membrane under pressure (e.g., about 5-100 psi, preferably about 10-50 psi, and more preferably about 20-40 psi), at a desired flow rate (e.g., about 0.5-10 gpm, preferably about 1-5 gpm, and more preferably about 1-2 gpm), and at a desired temperature (e.g., about 10-50 degrees C., preferably about 20-40 degrees C., and more preferably about 25-35 degrees C.). In some embodiments, the draw solution 403 is under vacuum and may be introduced continuously or intermittently, for example, via a recirculation loop with recharge capability. It should be noted that the feed 401 may also be introduced via a recirculation loop. Typically, the feed 401 is introduced to the active layer side of the membrane and the draw 403 is introduced to the support layer side; however, this can be reversed to coat the support side as opposed to the active layer side or, in some embodiments, reversed as part of the overall process to modify/coat both sides of the membrane. Alternatively or additionally, the at least one substance 402 can be added to both solutions to coat both sides simultaneously. However, depending on the application, it can be beneficial to modify/coat each side separately under the FO process, as the diffusion of solvent across the membrane may assist in more thoroughly modifying the membrane, for example, pulling the at least one substance 402 through the membrane to better cover the pores in the active and/or support layer, as opposed to merely depositing the substance 402 on a surface of the membrane.

During the modification process, solvent from the feed solution 401 is drawn across the membrane by the draw solution 403. The at least substance is drawn onto the surface of the membrane and results in a coating being applied thereto. A portion of the substance will also be at least partially drawn into the active layer of the membrane, thereby also coating the interior surfaces of the membrane pores. The coating of the at least one substance is secured via the non-specific Van der Waals forces or other mechanisms disclosed herein. In a particular embodiment of the process, the membrane is first flushed to prepare the membrane surfaces for modification. The optional initial flush can last about 10 to about 60 minutes and may include substantially pure water (e.g., RO or deionized water). Next, the feed and draw solutions 401, 403 are introduced, where the draw solution includes ammonium carbonate (other salts are contemplated and considered within the scope of the invention, e.g., potassium carbonate, NaCl, urea, or trisodium citrate) in a concentration of about 1.5 to about 6 molar carbonate, preferable about 2 to about 4 molar carbonate, and more preferably about 2.5 to 3.0 molar carbonate, with a nitrogen to carbon ratio of about 2:1 to 3:1, preferably about 2.1:1 to 2.5:1. The solutions are introduced for about 2 to 60 minutes, preferably about 5 to 45 minutes, and more preferably about 10 to 30 minutes. Typically, if using an alternative draw solution 403, such as 50,000 to 75,000 ppm NaCl, it may be necessary to buffer the feed solution 401. For example, a buffering solution may be added to the feed 401 to obtain a pH of about 10.

The next step typically includes an optional rinse step. During this step, the feed 401 is introduced at about 2 to 5 gpm with about 50,000 to 75,000 ppm of a salt solution, while the draw 403 is optionally introduced at about 0.5 to 2 gpm and a concentration of about 2.0 to 3.0 moles for about 5 to 10 minutes. In some embodiments, depending on the nature of the membrane and the at least one substance used, the optional, intermediate flushing step can help to align the at least one substance on the membrane. The particles of the at least one substance are typically randomly deposited on the membrane and the salt rinse (or other electrolytic solution) will tend to cause the particles to fall into alignment on the membrane or remove loose particles that may otherwise interfere with the deposition and alignment of other particles. The next step is to run an additional coating step similar to the first step previously described. Generally, the particles/substance 402 in subsequent coating steps will tend to fall into the established alignment. Once completed, the membranes can be optionally rinsed, undergo additional coating steps, or be put into service as is. The process may be repeated as often as necessary to achieve the desired coating (e.g., 3 coating steps and 3 rinse steps). In some embodiments, a final preservative flush, for example with an anti-oxidant such as SBS, is carried out for about 1 to 60 minutes, preferably about 2 to 10 minutes, more preferably about 5 minutes. In the exemplary embodiment, the SBS is introduced via the feed 401 at about 2 gpm and about 30 psi at a dosing rate of 7.5 L/hr for about 5 minutes. In some cases, additional sacrificial layers may be included in the repair/coating process.

Typically, the system 400 monitors the flux across the membrane during the various coating steps. In some embodiments, monitoring flux or some other operating parameter can indicate whether a particular step is complete, as opposed to relying strictly on duration of the step. For example, if the system 400 senses a drop in flux followed by a steady flux value for some predetermined time, this may indicate to the system 400 and/or an operator that the coating process or step is complete. Generally, the specific temperatures, pressures, flow rates, flux rates, pH, durations will vary to suit the particular application, e.g., the number, size, and configuration of the membranes, compatibility with materials in service, ambient conditions, desired results (e.g., increased rejection, increased solvent permeability, and/or a change in zeta potential), etc. Generally, the goal of the repair/modification process is to minimize or reverse the effect of damage to the membrane or increase a performance characteristic of the membrane. In some embodiments, the modification takes the form of coating the membrane with a substance that alters the contact angle of the membrane's active layer, which in turn makes the membrane more (reduced contact angle) or less (increased contact angle) hydrophilic to suit a particular application. In other embodiments, the coating disrupts or otherwise alters the zeta potential of the membrane's active layer, for example, rendering the overall zeta potential of the active layer more neutral, which in turn can maximize solute rejection by the membrane, or rendering the overall zeta potential as more positive or more negative to increase the rejection of particular solutes and/or increase the permeability of particular (e.g., desirable) solutes. In some embodiments, the operating parameters are selected to achieve a particular loading capacity {(concentration×flow rate×time)/membrane area} and deposition rate.

The various substances and delivery protocols as described above with respect to FIGS. 1A and 1B may also be used in the embodiments of the invention described herein as applicable. For example, different combinations of substances, dosages, rates of introduction, ambient conditions, etc. can be used to suit a particular application. In one exemplary embodiment, one or more membrane modules (e.g., a membrane array) can be repaired/modified by operating the modules in an FO mode with a draw solution introduced to one side of the membranes and a feed solution to the opposites sides of the membranes, where the feed solution is substantially pure water (e.g., RO permeate) with the substance added thereto. The specific flow rates and dosages will vary to suit a particular application and depend on, for example, the number of modules and the surface area of membrane to be modified.

Figure 5:
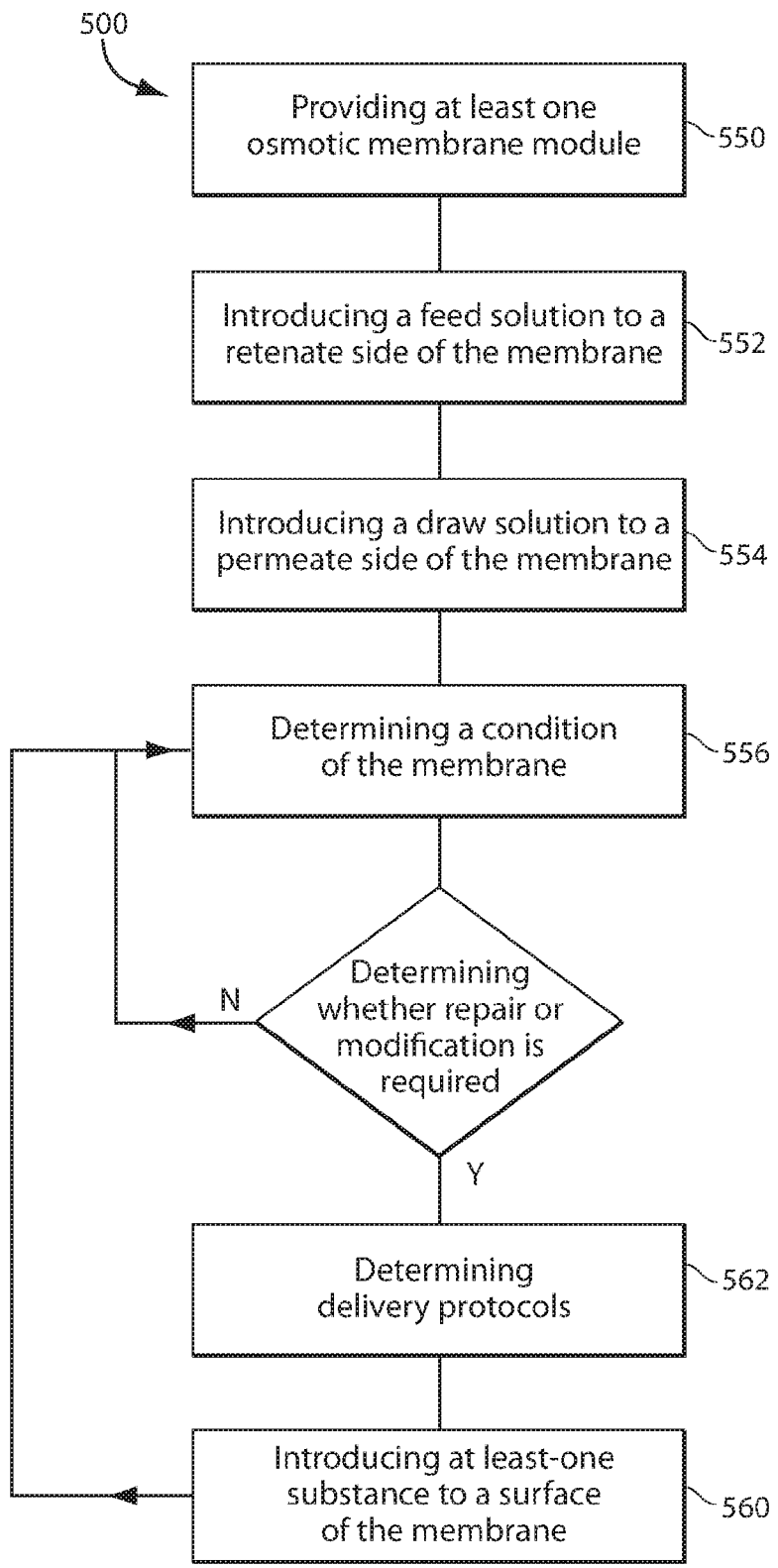
FIG. 5 is a flow chart illustrating the various steps of a method of repairing a membrane in accordance with one or more embodiments of the invention.

FIG. 5 depicts the various steps that may be carried out in order to perform the method 500 of repairing/modifying a membrane surface of a membrane in an osmotically driven membrane system. The method 500 includes the initial step of providing an osmotic membrane 550, where the membrane has a feed side and a permeate side and then, in any order, introducing a feed solution to the feed side of the forward osmosis membrane 552 and introducing a draw solution to the permeate side of the forward osmosis membrane 554. The method may further includes the step of determining a condition of the membrane or other aspect of the system (e.g., a salt concentration in the diluted draw solution) 556 and whether repair/modification is required 558. And finally, if required, the method 500 includes the step of introducing a substance on the feed and/or draw side of the membrane 560. If no repair is required, the system will continue to monitor the state of the membrane to determine a condition of the membrane. Even if a repair is required, the system will either continue to monitor the state of the membrane or resume monitoring of the system once the repair is complete. Typically, the system is always monitoring the state of the membrane or other aspect of the system to determine whether a repair is necessary and/or whether a repair in-process is complete and/or effective.

The method 500 may include additional steps relating to testing, sensing, and delivery protocols. For example, optional step 562 may be included to make multiple determinations with respect to carrying out the introduction step 560, such as determining where and/or how to introduce the substance and the particular substance(s) to introduce. Additional determinations/steps include determining whether an additional substance is required, controlling/varying the rate of introduction, interval/duration of introduction, concentration levels of the at least one substance, etc. The rate of introduction and concentration levels can be controlled to, for example, achieve a particular flux level or eliminate reverse salt flux.

The various systems described herein may be interconnected via conventional plumbing techniques and can include any number and combination of components, such as pumps, valves, sensors, gauges, etc., to monitor and control the operation of the various systems and processes described herein. The various components can be used in conjunction with a controller or control system to, for example, adjust or regulate at least one operating parameter of a component of the system, such as, but not limited to, actuating valves and pumps, as well as adjusting a property or characteristic of one or more fluid flow streams.

The control system may be in electronic communication with at least one sensor configured to detect at least one operational parameter of the system, such as a concentration, flow rate, pH level, pressure, or temperature, and may be generally configured to generate a control signal to adjust one or more operational parameters in response to a signal generated by a sensor. The control system typically includes an algorithm that facilitates generation of at least one output signal that is typically based on one or more of any of the actual sensed values and a target or desired value such as a set point. In accordance with one or more particular aspects, the control system can be configured to receive a representation of any measured property of any stream or component, and generate a control, drive or output signal to any of the system components, to reduce any deviation of the measured property from a target value.

Those skilled in the art should appreciate that the parameters and configurations described herein are exemplary and that actual parameters and/or configurations will depend on the specific application in which the systems and methods of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of the appended claims and equivalents thereto; the invention may be practiced otherwise than as specifically described.

What is claimed is:

1. A method of modifying an active layer of a membrane, the method comprising a step of:
   exposing the active layer of the membrane to a solution comprising at least one substance selected to modify a physical characteristic of the active layer of the membrane substantially without impacting a flux rate of the membrane, wherein the physical characteristic is a defect or operational parameter, wherein the step of exposing the active layer of the membrane to a solution comprises:
   installing the membrane within an osmotically driven membrane system;
   introducing a polymeric biguanide as a first substance to the solution to be introduced to the active layer side of the membrane;
   introducing at least one of naphthalene trisulfonic acid or 4-formyl-1,3-benzene disulfonic acid disodium salt as a second substance to the solution to be introduced to the active layer side of the membrane;
   introducing a draw solution to a side of the membrane opposite the active layer side; and
   operating the osmotically driven membrane system in a forward osmosis mode.

2. The method of claim 1, wherein the step of exposing the active layer of the membrane to the solution comprises introducing at least one of the first or second substance via at least one of a predetermined dosage, a predetermined concentration, predetermined intervals, or for a predetermined duration.

3. The method of claim 1 further comprising a step of rinsing the membrane active layer via steps of:
   interrupting the introduction of the solution to the active layer of the membrane; and
   introducing a saline solution to the active layer of the membrane.

4. A method of modifying a forward osmosis membrane, the method comprising steps of:
   providing a membrane comprising a support layer and a polyamide based active layer disposed thereon;
   functionalizing the active layer to make it reactive; and
   exposing the functionalized active layer to at least one of a primary, secondary, tertiary or quaternary amine,
   wherein the water soluble compound comprises 4-formyl-1,3-benzene disulfonic acid disodium salt.

5. The method of claim 4, wherein the step of functionalizing the active layer comprises exposing the active layer to a water soluble compound comprising at least one of an aldehyde, ester, or carboxylic functionality.

6. The method of claim 4, wherein the step of exposing the functionalized active layer to at least one of a primary, secondary, tertiary or quaternary amine comprises exposing the functionalized active layer to at least one of a biguanide functionalized compound or a urea functionalized compound.

* * * * *